(12) United States Patent
Han et al.

(10) Patent No.: US 8,761,090 B2
(45) Date of Patent: Jun. 24, 2014

(54) METHOD AND APPARATUS FOR UPLINK TRANSMISSION IN MULTI-ANTENNA SYSTEM

(75) Inventors: Seung Hee Han, Anyang-si (KR); Hyun Soo Ko, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 13/380,498

(22) PCT Filed: Oct. 7, 2010

(86) PCT No.: PCT/KR2010/006846
§ 371 (c)(1),
(2), (4) Date: Dec. 22, 2011

(87) PCT Pub. No.: WO2011/043598
PCT Pub. Date: Apr. 14, 2011

(65) Prior Publication Data
US 2012/0093090 A1    Apr. 19, 2012

Related U.S. Application Data

(60) Provisional application No. 61/253,058, filed on Oct. 19, 2009, provisional application No. 61/249,977, filed on Oct. 8, 2009.

(30) Foreign Application Priority Data

Oct. 4, 2010   (KR) ........................ 10-2010-0096312

(51) Int. Cl.
*H04W 4/00*    (2009.01)
(52) U.S. Cl.
USPC ........................................................ 370/328

(58) Field of Classification Search
USPC .................................. 375/240.24; 370/328
See application file for complete search history.

(56) References Cited

U.S. PATENT DOCUMENTS 7,839,760 B2 * 11/2010 Yu et al. ........................ 370/204
7,940,740 B2   5/2011 Krishnamurthy et al.
(Continued)

FOREIGN PATENT DOCUMENTS

| KR | 1020060035941 | 4/2006 |
|---|---|---|
| KR | 1020060128076 | 12/2006 |

(Continued)

OTHER PUBLICATIONS

Ghosh et al., "Multi-Antenna System Design for 3GPP LTE", Jun. 2011.

(Continued)

*Primary Examiner* — Asad Nawaz
*Assistant Examiner* — Syed S Ali
(74) *Attorney, Agent, or Firm* — Lee, Hong, Degerman, Kang & Waimey

(57) ABSTRACT

Provided are a method and apparatus for uplink transmission in a multi-antenna system. A terminal transmits a plurality of first transmission symbols via a plurality of antennas using a first spatial processing performed on the first transmission symbols, and transmits a plurality of second transmission symbols via a plurality of antennas using a second spatial processing performed on the second transmission symbols. At least one column or at least one row of a first spatial processing matrix used in the first spatial processing is switched to form a second SFBC matrix used in the second spatial processing. According to the present invention, peak-to average power (PAPR)/cubic metric (CM) ratio can be kept at a low level, and imbalanced transmission power among antennas can be evened out.

12 Claims, 36 Drawing Sheets

(56) References Cited

U.S. PATENT DOCUMENTS

| | | | |
|---|---|---|---|
| 8,248,910 B2* | 8/2012 | Jokela et al. | 370/208 |
| 8,315,325 B2 | 11/2012 | Lee et al. | |
| 2004/0114691 A1* | 6/2004 | Kim | 375/260 |
| 2004/0196919 A1 | 10/2004 | Mehta et al. | |
| 2006/0034386 A1 | 2/2006 | Vummintala et al. | |
| 2006/0034390 A1 | 2/2006 | Vummintala et al. | |
| 2006/0039496 A1 | 2/2006 | Chae et al. | |
| 2006/0280229 A1* | 12/2006 | Kim et al. | 375/144 |
| 2007/0171808 A1 | 7/2007 | Wu et al. | |
| 2007/0283323 A1* | 12/2007 | Boden et al. | 717/120 |
| 2008/0014870 A1 | 1/2008 | Kim | |
| 2008/0075184 A1 | 3/2008 | Muharemovic et al. | |
| 2008/0095254 A1 | 4/2008 | Muharemovic et al. | |
| 2008/0117833 A1 | 5/2008 | Borran et al. | |
| 2008/0165893 A1 | 7/2008 | Malladi et al. | |
| 2008/0233966 A1 | 9/2008 | Scheim et al. | |
| 2009/0059884 A1* | 3/2009 | Zhang et al. | 370/342 |
| 2009/0092073 A1 | 4/2009 | Doppler et al. | |
| 2009/0109908 A1 | 4/2009 | Bertrand et al. | |
| 2009/0175159 A1 | 7/2009 | Bertrand et al. | |
| 2009/0213955 A1 | 8/2009 | Higuchi et al. | |
| 2010/0246663 A1* | 9/2010 | Citta et al. | 375/240.01 |
| 2011/0026601 A1* | 2/2011 | Mueller et al. | 375/240.24 |
| 2011/0205994 A1* | 8/2011 | Han et al. | 370/329 |
| 2012/0014243 A1 | 1/2012 | Bertrand et al. | |
| 2012/0093139 A1* | 4/2012 | Hooli et al. | 370/337 |

FOREIGN PATENT DOCUMENTS

| | | |
|---|---|---|
| KR | 10-2008-0035437 | 4/2008 |
| KR | 1020080071065 | 8/2008 |
| KR | 10-2009-0028461 | 3/2009 |
| KR | 10-2009-0099500 | 9/2009 |

OTHER PUBLICATIONS

Meng et al., "A Novel Space-Frequency Block Coding Scheme for SC-FDMA", Jun. 2011.

United States Patent and Trademark Office U.S. Appl. No. 13/128,404, Notice of Allowance dated Mar. 21, 2013, 11 pages.

Korean Intellectual Property Office Application Serial No. 10-2011-7026349, Office Action dated Apr. 26, 2013, 4 pages.

Lang Tong et al., "Pilot-assisted wireless transmissions: general model, design criteria, and signal processing", IEEE Signal Processing Magazine, vol. 21, Issue: 6, Nov. 2004.

Korean Intellectual Property Office Application Serial No. 10-2011-7010862, Notice of Allowance dated Dec. 31, 2012, 2 pages.

Korean Intellectual Property Office Application Serial No. 10-2011-7026349, Notice of Allowance dated Aug. 8, 2013, 5 pages.

* cited by examiner

METHOD AND APPARATUS FOR UPLINK TRANSMISSION IN MULTI-ANTENNA SYSTEM

CROSS-REFERENCE TO RELATED APPLICATIONS

This application is the National Stage filing under 35 U.S.C. 371 of International Application No. PCT/KR2010/006846, filed on Oct. 7, 2010, which claims the benefit of earlier filing date and right of priority to Korean Patent Application No. 10-2010-0096312, filed on Oct. 4, 2010, and also claims the benefit of U.S. Provisional Application Ser. No. 61/253,058, filed on Oct. 19, 2009, and 61/249,977, filed on Oct. 8, 2009, the contents of all of which are all incorporated by reference herein in their entireties.

BACKGROUND OF THE INVENTION

1. Field of the Invention

The present invention relates to wireless communications, and more particularly, to a method and apparatus for uplink transmission in a wireless communication system.

2. Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

In the uplink channel, a peak-to-average power ratio (PAPR)/cubic metric (CM) property is important for power management of a user equipment. The uplink channel needs to maintain a low PAPR/CM property to ensure long battery standby-time and low battery consumption. For this, LTE uses a sequence having a low PAPR/CM property such as a Zadoff-Chu (ZC) sequence in a control channel.

However, the introduction of a new technique such as a multiple input multiple output (MIMO) technique, a multi-carrier technique, or the like may result in deterioration of a PAPR/CM property of the uplink channel.

Accordingly, there is a need for an uplink transmission method and apparatus for maintaining a low PAPR/CM property.

SUMMARY OF THE INVENTION

The present invention provides an uplink transmission method and apparatus for switching a spatial process in a multi-antenna system.

The present invention also provides an uplink transmission method and apparatus for reducing transmit power imbalance between antennas.

In an aspect, a method for uplink transmission in a multi-antenna system is provided. The method includes transmitting a plurality of first transmission symbols through a plurality of antennas by using a first spatial process performed on the plurality of first transmission symbols, and transmitting a plurality of second transmission symbols through the plurality of antennas by using a second spatial process performed on the plurality of second transmission symbols, wherein at least one row or at least one column of a first spatial processing matrix used in the first spatial process is switched to configure a second spatial processing matrix used in the second spatial process.

The first and second spatial processes may be space-frequency block coding (SFBC), and the first and second spatial processing matrices may be SFBC matrices.

The first and second spatial processes may be space-code block coding (SCBC), and the first and second spatial processing matrices may be SCBC matrices.

The method may further include generating a plurality of modulation symbols by modulating encoded bits, wherein the plurality of first transmission symbols and the plurality of second transmission symbols are the plurality of modulation symbols.

The plurality of first transmission symbols and the plurality of second transmission symbols may be transmitted on a physical uplink control channel (PUCCH).

The method may further include generating a plurality of modulation symbols by modulating encoded bits, and generating the plurality of first transmission symbols and the plurality of second transmission symbols by performing discrete Fourier transform (DFT) spreading on the plurality of modulation symbols.

The plurality of first transmission symbols and the plurality of second transmission symbols may be independently subjected to DFT.

The plurality of first transmission symbols and the plurality of second transmission symbols may be transmitted on a physical uplink shared channel (PUSCH).

In another aspect, a user equipment includes a radio frequency (RF) unit for transmitting and receiving a radio signal, and a processor, coupled to the RF unit, and configured for processing a plurality of first transmission symbols by using a first spatial process, and processing a plurality of second transmission symbols by using a second spatial process, wherein at least one row or at least one column of a first spatial processing matrix used in the first spatial process is switched to configure a second spatial processing matrix used in the second spatial process.

According to the present invention, a low peak-to-average power (PAPR)/cubic metric (CM) ratio can be maintained, and imbalanced transmit power between antennas can be averaged.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Figure 1:
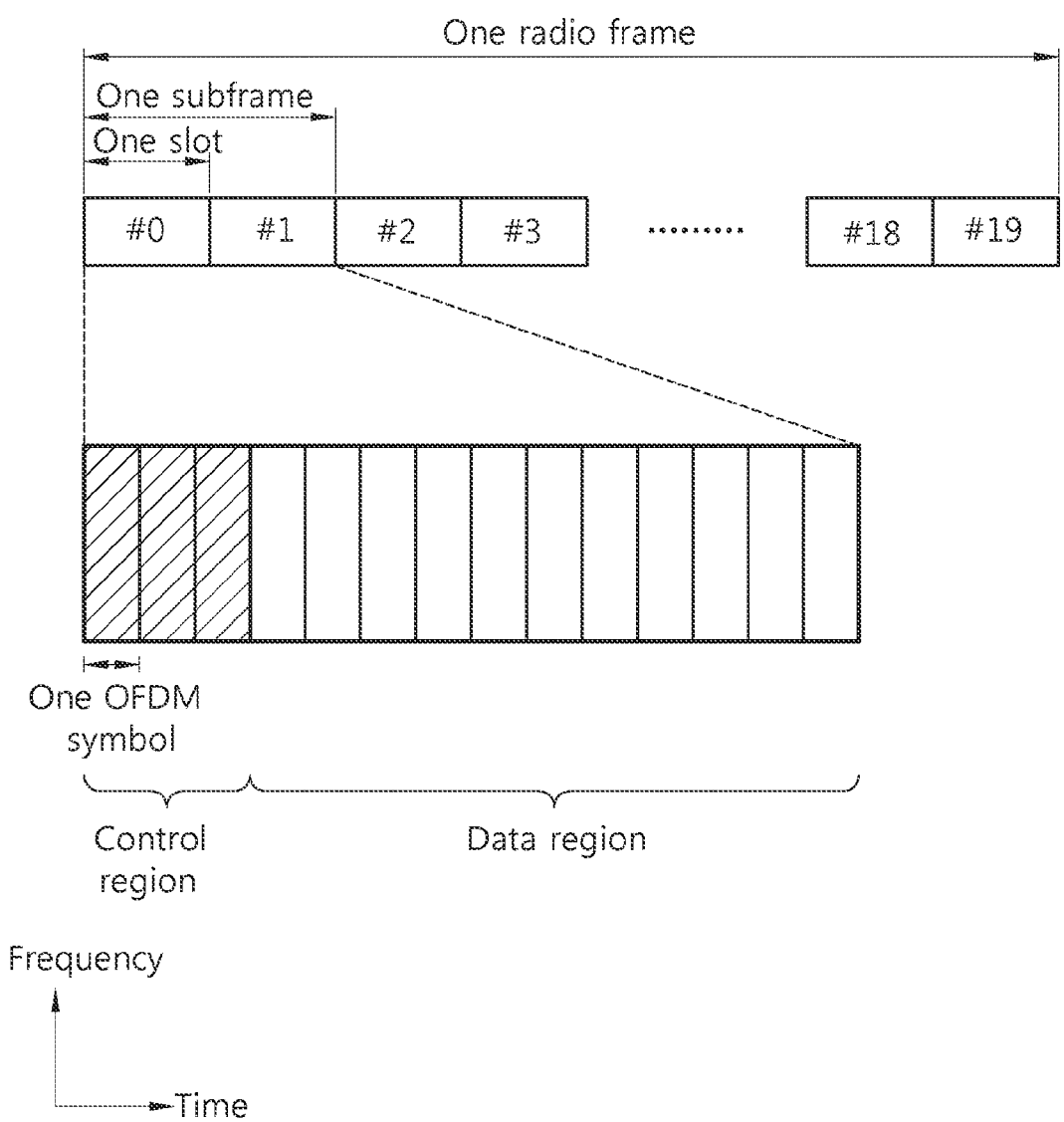
FIG. 1 shows a structure of a radio frame and a downlink subframe in 3rd generation partnership project (3GPP) long term evolution (LTE).

FIG. 1 shows a structure of a radio frame and a downlink subframe in $3^{rd}$ generation partnership project (3GPP) long term evolution (LTE). The section 6 of 3GPP TS 36.211 V8.7.0 (2009-05) 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 10 subframes. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. The OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A downlink (DL) subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol in the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PHICH carries a positive-acknowledgement (ACK)/negative-acknowledgement (NACK) signal for uplink hybrid automatic repeat request (HARQ). The ACK/NACK signal for UL data transmitted by the UE is transmitted on the PHICH.

Control information transmitted on the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The control region in the DL subframe includes a plurality of control channel elements (CCEs). The CCE is a logical allocation unit used to provide the PDCCH with a code rate depending on a wireless channel. The CCE corresponds to a plurality of resource element groups (REGs). According to a relation between the number of CCEs and the code rate provided by the CCEs, the PDCCH format and a possible number of bits of the PDCCH are determined.

Figure 2:
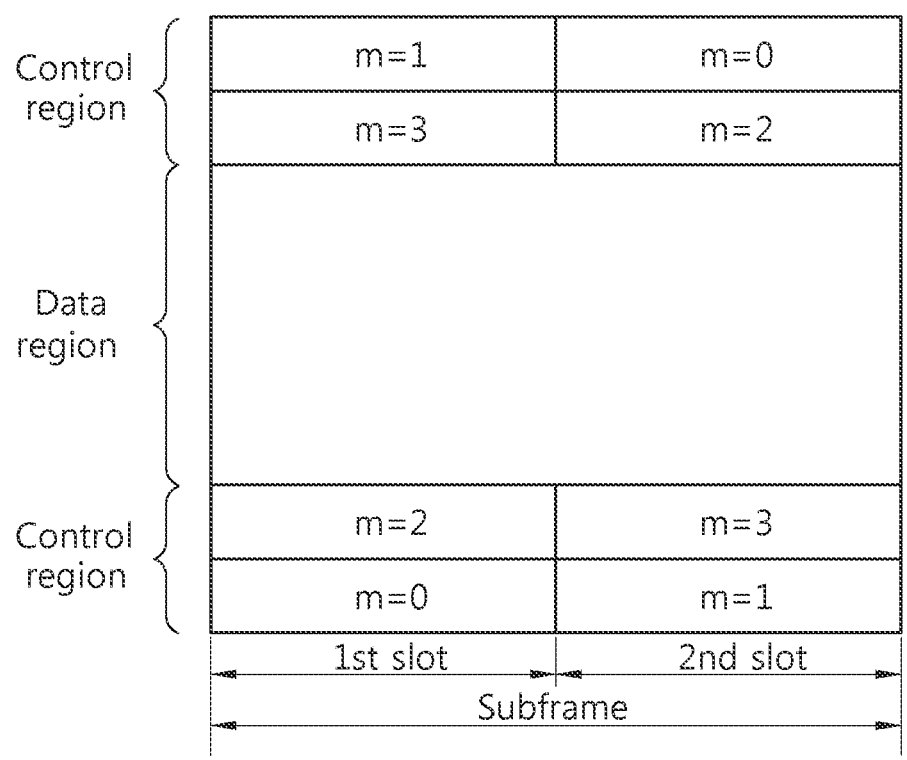
FIG. 2 shows an example of a UL subframe in 3GPP LTE.
Figure 2:
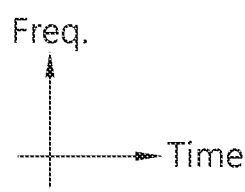

FIG. 2 shows an example of a UL subframe in 3GPP LTE. A UL subframe can be divided into a control region to which a physical uplink control channel (PUCCH) for carrying UL control information is allocated and a data region to which a physical uplink shared channel (PUSCH) for carrying UL data is allocated.

The PUCCH for one UE is allocated in an RB pair. RBs belonging to the RB pair occupy different subcarriers in each of a 1$^{st}$ slot and a 2$^{nd}$ slot. In FIG. 2, m is a location index indicating a logical frequency-domain location of the RB pair allocated to the PUCCH in the subframe. It shows that RBs having the same value m occupy different subcarriers in two slots.

According to 3GPP TS 36.211 V8.7.0, the PUCCH supports multiple formats. A PUCCH having a different number of bits per subframe can be used according to a modulation scheme depending on a PUCCH format.

Table 1 below shows an example of a modulation scheme and the number of bits per subframe with respect to the PUCCH format.

TABLE 1

| PUCCH Format | Modulation Scheme | Number of Bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad \text{[Equation 1]}$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

The length of the sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{CS})$.

$$r(n, I_{cs}) = r(n) \cdot \exp\left(\frac{j2\pi I_{cs}n}{N}\right), \quad \text{[Equation 2]}$$

$$0 \leq I_{cs} \leq N-1$$

In Equation 2, $I_{CS}$ denotes a CS index indicating a CS amount ($0 \leq I_{CS} \leq N-1$).

Hereinafter, the available CS index of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 6, the total number of available CS indices of the base sequence is 6.

Hereinafter, a modulation symbol represents a complex-valued symbol that indicates a position on a constellation of a corresponding encoded bit. However, the modulation symbol can be expressed in various forms according to implementations.

Now, HARQ ACK/NACK signal transmission in PUCCH formats 1/1a/1b (hereinafter, these formats are collectively referred to as a PUCCH format 1) will be described.

Figure 3:
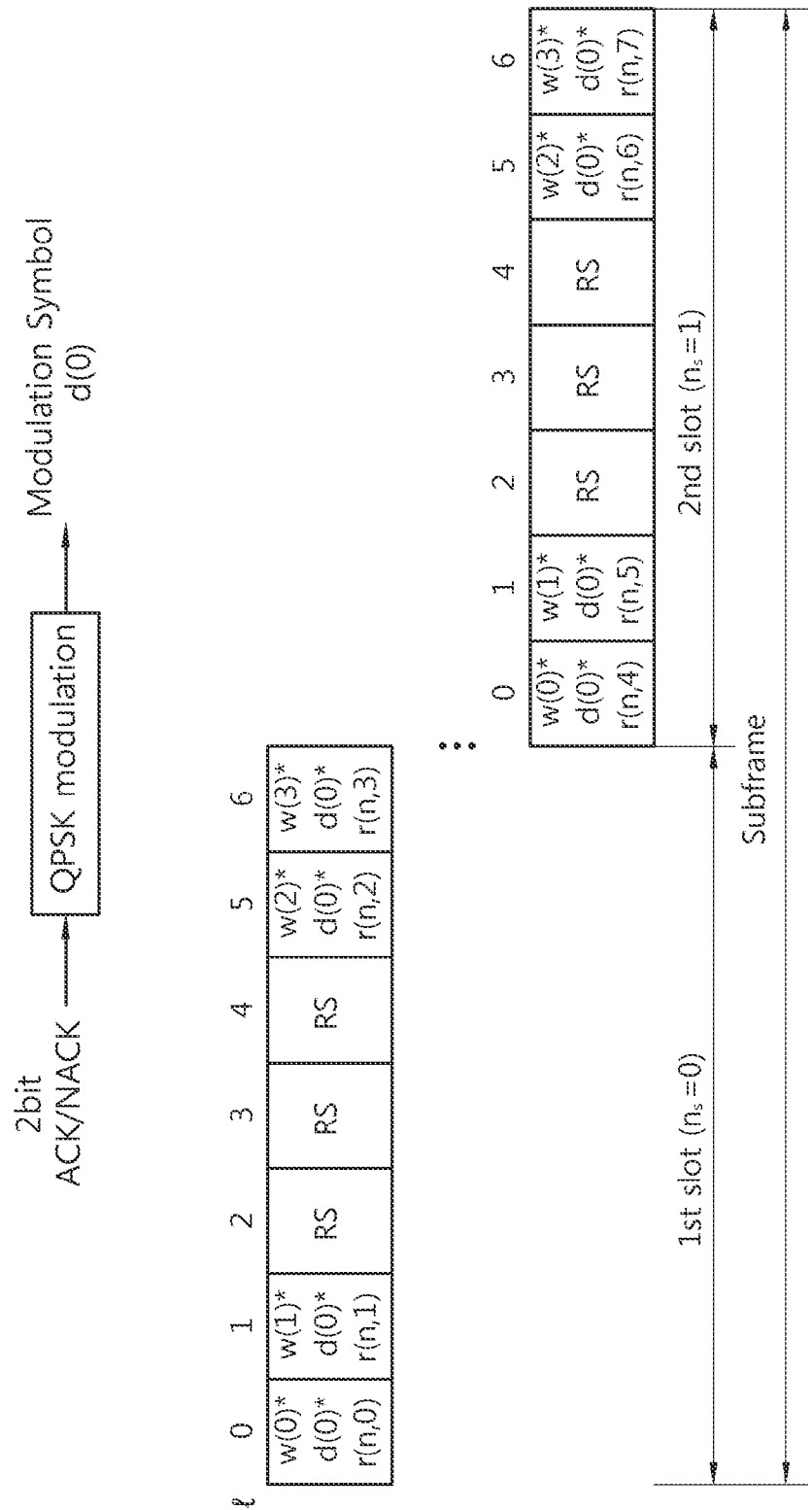
FIG. 3 shows a PUCCH format 1b in a normal CP in 3GPP LTE.
Figure 4:
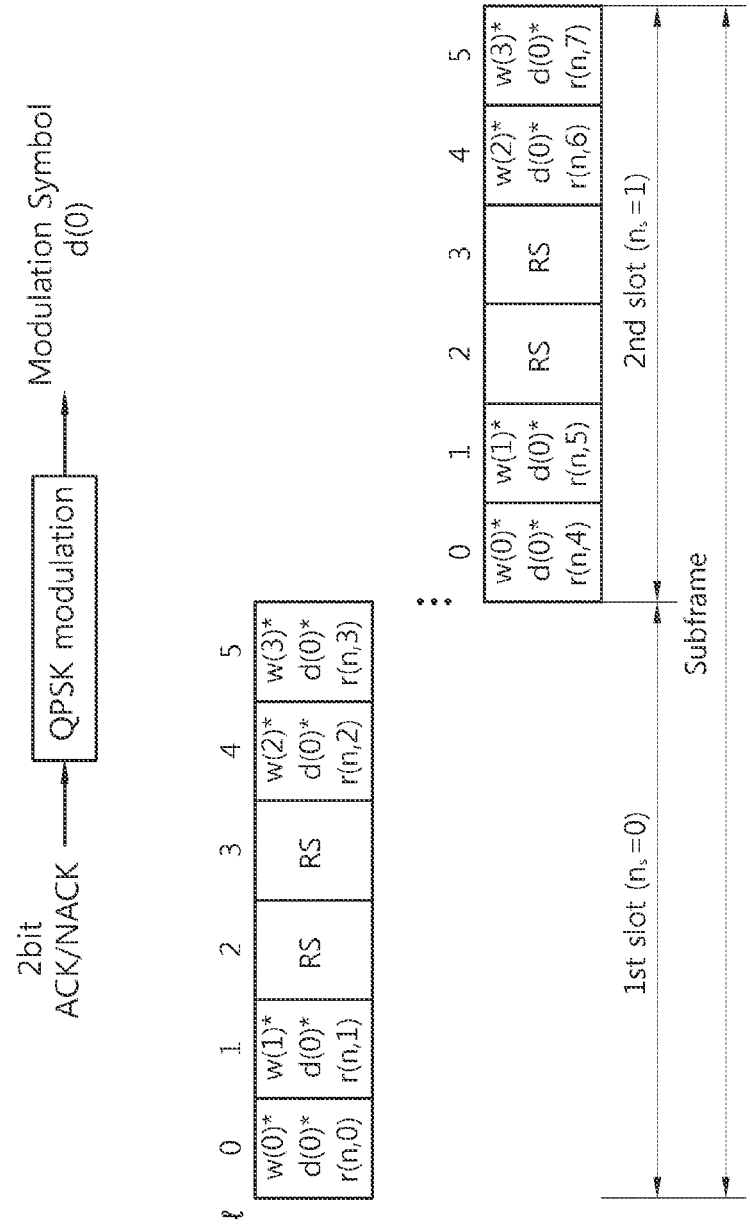
FIG. 4 shows a PUCCH format 1b in an extended CP in 3GPP LTE.

FIG. 3 shows a PUCCH format 1b in a normal CP in 3GPP LTE. FIG. 4 shows a PUCCH format 1b in an extended CP in 3GPP LTE. A location of a reference signal (RS) and the number of RSs are different between the normal CP and the extended CP since the number of OFDM symbols included in each slot are different, but ACK/NACK transmission is performed with the same structure between the normal CP and the extended CP.

A modulation symbol d(0) is generated by modulating a 2-bit ACK/NACK signal based on quadrature phase shift keying (QPSK). The QPSK modulation is for exemplary purposes only, and thus various modulation schemes such as binary phase shift keying (BPSK) or m-quadrature amplitude modulation (QAM) can also be used.

Since 5 OFDM symbols are present for transmission of the ACK/NACK signal in one slot in the normal CP or the extended CP, 10 OFDM symbols are present in total for transmission of the ACK/NACK signal in one subframe.

The modulation symbol d(0) is spread to a cyclically shifted sequence $r(n, I_{CS})$. When a one-dimensionally spread sequence corresponding to an $(i+1)^{th}$ OFDM symbol is denoted by m(i), it can be expressed as follows.

$$\{m(0), m(1), \ldots, m(9)\} = \{d(0)r(n, I_{CS}), d(0)r(n, I_{CS}), d(0)r(n, I_{CS})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 2

| Index (i) | $[w_i(0), w_i(1), w_i(2), w_i(3)]$ |
|---|---|
| 0 | [+1, +1, +1, +1] |
| 1 | [+1, -1, +1, -1] |
| 2 | [+1, -1, -1, +1] |

An orthogonal sequence $w_i(k)$ (where i is a sequence index, $0 \leq k \leq K-1$) having a spread factor K=3 uses the following sequence.

TABLE 3

| Index (i) | $[w_i(0), w_i(1), w_i(2)]$ |
|---|---|
| 0 | $[+1, +1, +1]$ |
| 1 | $[+1, e^{j2\pi/3}, e^{j4\pi/3}]$ |
| 2 | $[+1, e^{j4\pi/3}, e^{j2\pi/3}]$ |

A different spread factor can be used for each slot. In 3GPP LTE, a last OFDM symbol in a subframe is used for transmission of a sounding reference signal (SRS). In this case, a PUCCH uses a spread factor K=4 for a $1^{st}$ slot and uses a spread factor K=3 of a $2^{nd}$ slot.

Therefore, when any orthogonal sequence index i is given, two-dimensionally spread sequences s(0), s(1), . . . , s(9) can be expressed as follows.

$$\{s(0),s(1),\ldots,s(9)\}=\{w_i(0)m(0),w_i(1)m(1),w_i(2)m(2),w_i(3)m(3),w_i(4)m(4),w_i(0)m(5),w_i(1)m(7),w_i(2)m(8),w_i(3)m(9)\}$$

A CS index $I_{CS}$ can vary depending on a slot number $n_s$ in a radio frame and/or a symbol index l in a slot.

For clarity of description, when a $1^{st}$ CS index is set to 0 and a CS index value is increased by one in each OFDM symbol, as shown in FIG. 3 and FIG. 4, it can be expressed as follows.

$$\{s(0),s(1),\ldots,s(9)\}=\{w_i(0)d(0)r(n,0),w_i(1)d(1)r(n,1),\ldots w_i(3)d(9)r(n,9)\}$$

The two-dimensionally spread sequences $\{s(0), s(1), \ldots, s(9)\}$ are subjected to IFFT and thereafter are transmitted by using corresponding RBs. Accordingly, an ACK/NACK signal is transmitted on a PUCCH.

An orthogonal sequence index i, a CS index $I_{CS}$, and an RB index m are parameters required to configure the PUCCH, and are resources used to identify the PUCCH (or UE). If the number of available CSs is 12 and the number of available orthogonal sequence indices is 3, PUCCHs for 36 UEs in total can be multiplexed to one RB.

A reference signal for the PUCCH format 1 also uses a cyclically shifted sequence generated from a base sequence. Although 2-dimensional spreading using an orthogonal sequence is also applied, a spreading factor is 3 in case of a normal CP, and is 2 in case of an extended CP.

In order for the UE to acquire the three parameters for configuring the PUCCH, a resource index $n^{(1)}_{PUUCH}$ is defined in 3GPP LTE. A resource index $n^{(1)}_{PUUCH}$ is defined to $n^{(1)}_{PUUCH}=n_{CCE}+N^{(1)}_{PUUCH}$, where $n_{CCE}$ is an index of a $1^{st}$ CCE of a PDCCH used for transmission of a corresponding DCI (i.e., a DL resource allocation used for reception of a DL transport block corresponding to an ACK/NACK signal), and $N^{(1)}_{PUUCH}$ is a parameter reported by a BS to a UE via a higher layer message.

As a result, it can be said that the ACK/NACK resource used for transmission of the PUCCH is implicitly determined depending on a resource of a corresponding PDCCH. This is because the BS does not separately report a resource used by the UE for transmission of the PUCCH for the ACK/NACK signal and indirectly reports it by using a resource of a PDCCH used for resource allocation of a DL transport block.

Figure 5:
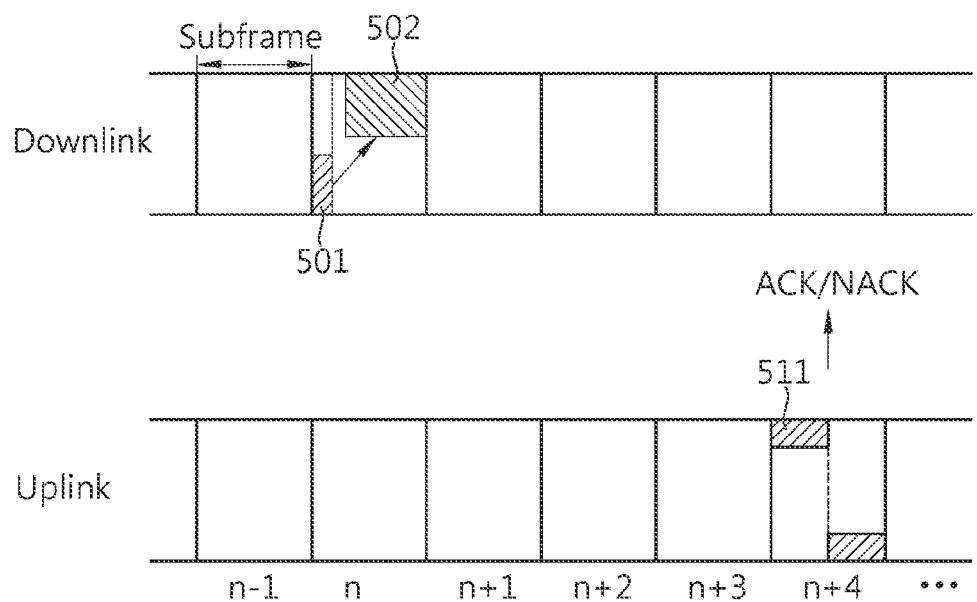
FIG. 5 is a diagram showing an example of performing HARQ.

FIG. 5 is a diagram showing an example of performing HARQ. A UE monitors PDCCHs and receives a PDCCH 501, including a downlink grant, in an n-th subframe. The UE receives a downlink transport block through a PDSCH 502 indicated by the downlink grant.

The UE transmits an ACK/NACK signal for the downlink transport block on the PUCCH 511 in an $(n+4)^{th}$ subframe. The ACK/NACK signal becomes an ACK signal if the downlink transport block is successfully decoded and becomes a NACK signal if the downlink transport block is unsuccessfully decoded. When the NACK signal is received, a BS can retransmit the downlink transport block until an ACK signal is received or until the number of times of performing retransmission reaches a maximum possible number.

To constitute the PUCCH 511, the UE uses resource allocation of the PDCCH 501. That is, the lowest CCE index used to transmit the PDCCH 501 becomes $n_{CCE}$, and a resource index, such as $n^{(1)}_{PUUCH}=n_{CCE}+N^{(1)}_{PUUCH}$, is determined.

Now, CQI transmission in a PUCCH format 2 will be described.

A CQI can include a wideband CQI, a subband CQI, a precoding matrix indication (PMI) indicating an index of a precoding matrix, and/or rank indication (RI) indicating a rank.

Figure 6:
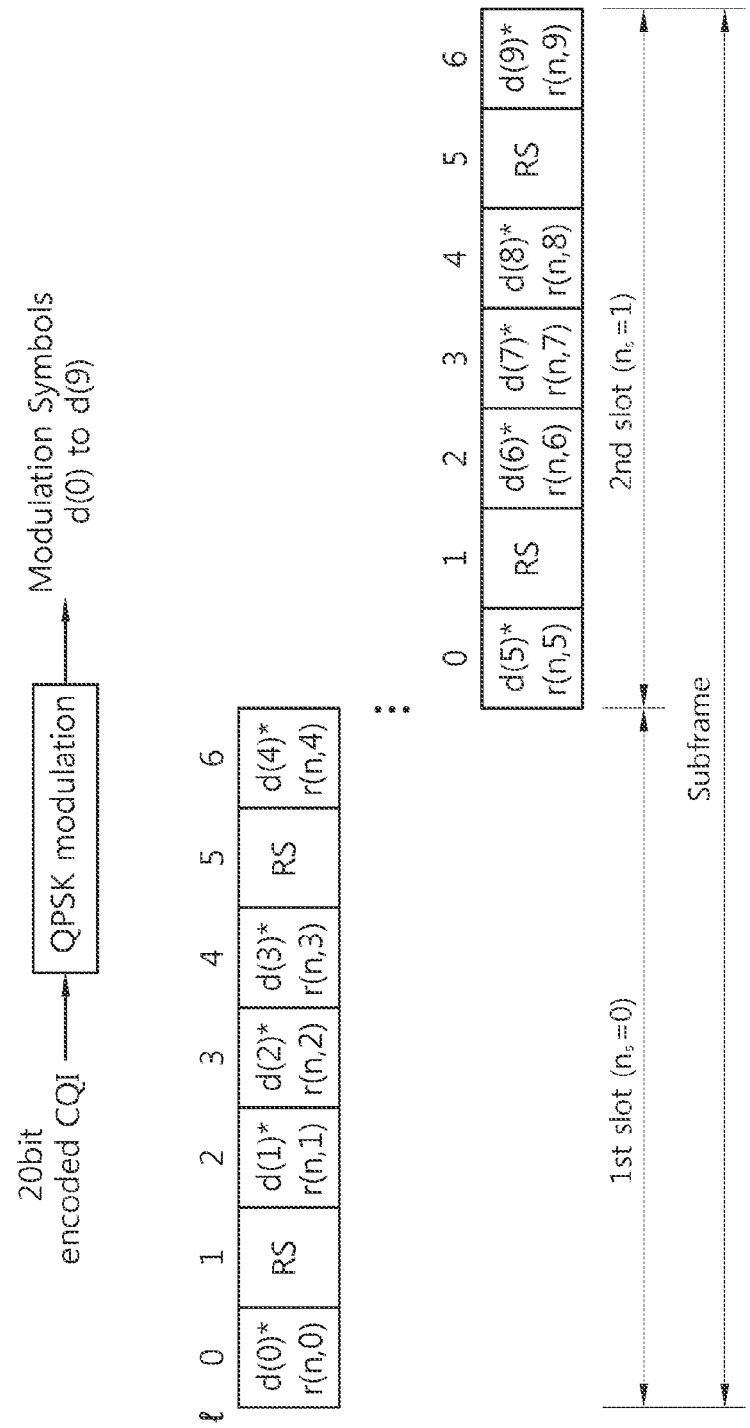
FIG. 6 shows a PUCCH format 2 in case of a normal CP in 3GPP LTE.
Figure 7:
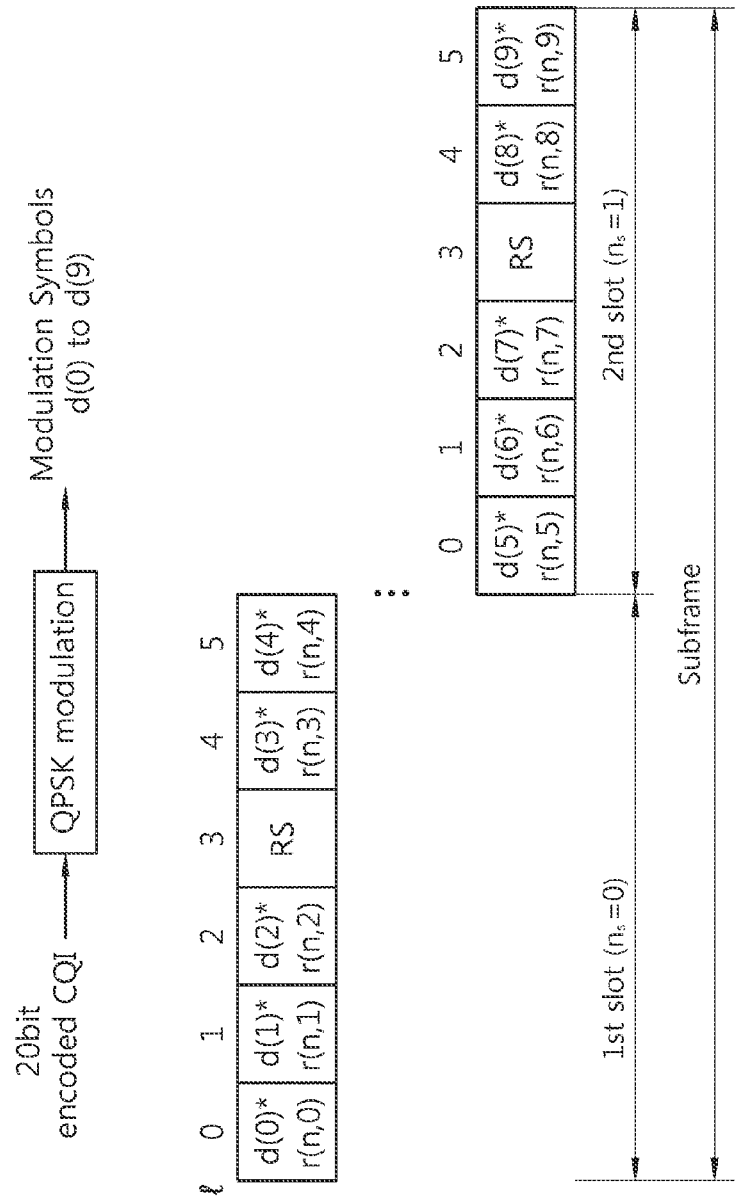
FIG. 7 shows a PUCCH format 2 in case of an extended CP in 3GPP LTE.

FIG. 6 shows a PUCCH format 2 in case of a normal CP in 3GPP LTE. FIG. 7 shows a PUCCH format 2 in case of an extended CP in 3GPP LTE. The number of OFDM symbols included per slot is different between the normal CP and the extended CP, and thus a location of a reference signal (RS) and the number of RSs are different. However, a CQI structure is the same.

Channel coding is performed on a CQI payload to generate an encoded CQI. In 3GPP LTE, a payload of a PUCCH format 2 is up to 13 bits, and a 20-bit encoded CQI is generated always irrespective of a size of a payload in use.

From the 20-bit encoded CQI, 10 modulation symbols d(0), . . . ,d(9) are generated by using quadrature phase shift keying (QPSK) modulation. Since one slot has five OFDM symbols for CQI transmission in the normal CP or the extended CP, one subframe has 10 OFDM symbols for CQI transmission. Therefore, 10 modulation symbols are generated such that one modulation symbol corresponds to one OFDM symbol.

The modulation symbol corresponding to each OFDM symbol is spread to a cyclically shifted sequence $r(n,I_{CS})$. When a spread sequence corresponding to an $(i+1)^{th}$ OFDM symbol in a subframe is denoted by s(i), it can be expressed as follows.

$$\{s(0),s(1),\ldots,s(9)\}=\{d(0)r(n,I_{CS}),d(1)r(n,I_{CS}),\ldots,d(9)r(n,I_{CS})\}$$

The cyclically shifted index $I_{CS}$ can vary depending on a slot number $n_s$ in a radio frame and/or a symbol index l in a slot.

For clarity of description, when a $1^{st}$ CS index is set to 0 and a value of the CS index is increased by one in every OFDM symbol, as shown in FIG. 6 and FIG. 7, it can be expressed as follows.

$$\{s(0),s(1),\ldots,s(9)\}=\{d(0)r(n,0),d(1)r(n,1),\ldots,d(9)r(n,9)\}$$

Spread sequences $\{s(0), s(1), \ldots, s(9)\}$ are subjected to IFFT by using corresponding resource blocks, and then are transmitted. Accordingly, the CQI is transmitted on a PUCCH.

In the PUCCH of 3GPP LTE, a BS identifies the PUCCH received from each UE by using different CS and/or orthogonal sequences in the same or different resource blocks. For example, a $1^{st}$ UE transmits a CQI on the basis of a $1^{st}$ CS sequence, and a $2^{nd}$ UE transmits a CQI on the basis of a $2^{nd}$ CS sequence. Thus, the PUCCH of a plurality of UEs is multiplexed in the same resource block. If the number of available CSs is 12, 12 UEs can be multiplexed to one resource block.

The UE has to know a CS index $I_{CS}$ and an RB index m to constitute the PUCCH format 2. In 3GPP LTE, the BS reports one resource index $n_{PUCCH}^{(2)}$ to the UE, and the UE acquires the CS index $I_{CS}$ and the RB index m on the basis of a resource index $n_{PUCCH}^{(2)}$.

Meanwhile, 3GPP LTE supports only a single antenna in uplink transmission. However, in 3GPP LTE-advanced (A) which is an evolution of 3GPP LTE, there is an ongoing resource for increasing a data rate by using multiple antennas and multiple carriers.

Orthogonal space resource spatial multiplexing (OSRSM) is one example of a method for uplink multi-antenna transmission.

Figure 8:
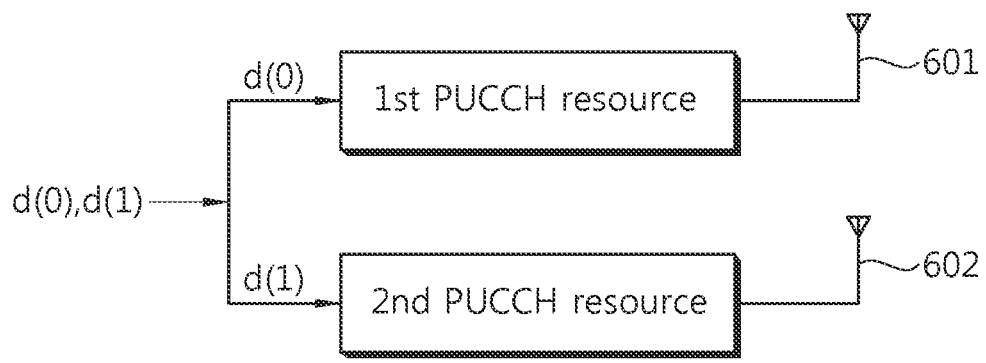
FIG. 8 shows an example of OSRSM.

FIG. 8 shows an example of OSRSM.

A time resource, a frequency resource, and/or a code resource which are used for PUCCH transmission are called a PUCCH resource. As described above, an index of a PUCCH resource required to transmit an ACK/NACK signal on a PUCCH (such an index is called an ACK/NACK resource index or a PUCCH index) can be expressed by at least any one of an orthogonal sequence index i, a CS index $I_{CS}$, an RB index m, and an index for obtaining the three indices. The PUCCH resource can include at least any one of an orthogonal sequence, a CS, an RB, and a combination thereof.

A $1^{st}$ modulation symbol d(0) is transmitted through a $1^{st}$ antenna 601 by using a $1^{st}$ PUCCH resource. A $2^{nd}$ modulation symbol d(1) is transmitted through a $2^{nd}$ antenna 602 by using a $2^{nd}$ PUCCH resource.

More specifically, assume that the modulation symbols d(0) and d(1) represent two ACK/NACK signals. A $1^{st}$ PUCCH resource index is used to acquire a $1^{st}$ orthogonal sequence index $i_1$, a $1^{st}$ CS index $I_{CS1}$, and a $1^{st}$ RB index $m_1$, thereby configuring a $1^{st}$ PUCCH. A $2^{nd}$ PUCCH resource index is used to acquire a $2^{nd}$ orthogonal sequence index $i_2$, a $2^{nd}$ CS index $I_{CS2}$, and a $2^{nd}$ RB index $m_2$, thereby configuring a $2^{nd}$ PUCCH. The modulation symbol d(0) is transmitted on the $1^{st}$ PUCCH through the $1^{st}$ antenna 601. The modulation symbol d(1) is transmitted on the $2^{nd}$ PUCCH through the $2^{nd}$ antenna 602.

Although two PUCCH resources and two antennas are described herein for example, there is no restriction on the number of antennas to be applied.

Hereinafter, an antenna can represent a physical antenna, a logical antenna, and/or a layer, and can be referred to as an antenna port.

Bit-level permutation in which information bits of different control signals are exchanged on a bit basis can be performed. Assume that QPSK modulation is used, a $1^{st}$ ACK/NACK signal has 2 bits {a0 a1}, and a $2^{nd}$ ACK/NACK signal has 2 bits {b0 b1}. The bit-level permutation is performed before modulation, and thus d(0) can represent {b0 a1} and d(1) can represent {a0 b1}.

Symbol-level permutation can be performed. For example, d(0)+d(1) can be transmitted through the $1^{st}$ antenna 601 by using the $1^{st}$ PUCCH resource, and d(0)-d(1) can be transmitted through the $2^{nd}$ antenna 602 by using the $2^{nd}$ PUCCH resource. Alternatively, d(0)-d(1)* can be transmitted through the $1^{st}$ antenna 601 by using the $1^{st}$ PUCCH resource, and d(0)*+d(1) can be transmitted through the $2^{nd}$ antenna 602 by using the $2^{nd}$ PUCCH resource.

d(0)* and d(1)* respectively denote complex conjugates of d(0) and d(1).

In addition, phase rotation can be applied. For example, d(0)+d(1)exp(j*α) can be transmitted through the $1^{st}$ antenna 601 by using the $1^{st}$ PUCCH resource, and d(0)-d(1)exp(j*β) can be transmitted through the $2^{nd}$ antenna 602 by using the $2^{nd}$ PUCCH resource. Herein, α and β denote a phase rotation amount, where α=β or α≠β. Alternatively, d(0)-d(1)*exp(j*α) can be transmitted through the $1^{st}$ antenna 601 by using the $1^{st}$ PUCCH resource, and d(0)*exp(j*β)+d(1) can be transmitted through the $2^{nd}$ antenna 602 by using the $2^{nd}$ PUCCH resource.

The number of resources allocated to a control signal (i.e., ACK/NACK signal or CQI) may be equal to the number of resources used for a reference signal. For example, if n resources allocated for transmission of n control signals are allocated, n resources can be allocated for the reference signal. Reference signal sequences transmitted using the allocated n resources can be transmitted for respective antennas in order to perform channel estimation per antenna.

Now, PUCCH transmission using multi-sequence modulation (MSM) and resource selection will be described.

Although resource selection in a PUCCH format 2 of a normal CP in which a maximum payload is 13 bits is described hereinafter for example, the technical features of the present invention are not limited to a control signal type or a PUCCH format.

For clarity of description, a CS is used as a resource, and a CS index is used as a resource index. However, it is obvious for those ordinary skilled in the art that the technical features of the present invention can apply to any resource used to configure a control channel, such as a orthogonal sequence, an RB, a frequency-domain resource, a time-domain resource, a code-domain resource, a combination thereof, etc.

As described above, one CS index $I_{CS}$ and an RB index m are required to configure a PUCCH format 2. Hereinafter, two CS indices $I_{CS1}$ and $I_{CS2}$ are considered as a PUCCH resource.

Figure 9:
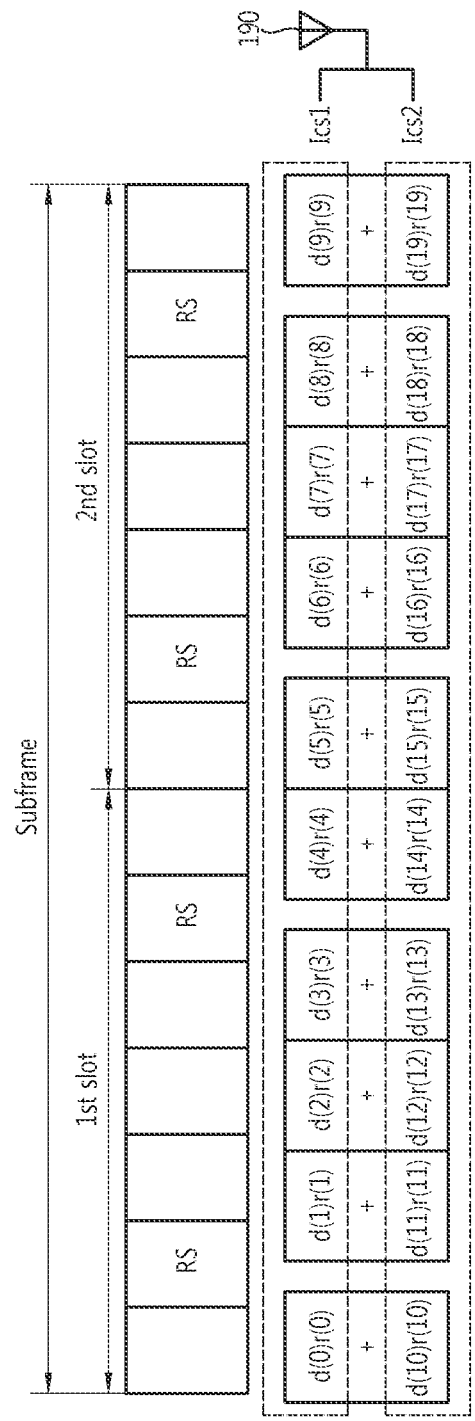
FIG. 9 shows an example of MSM in a single antenna.

FIG. 9 shows an example of MSM in a single antenna.

The MSM is used to increase a payload size of a control channel by using a plurality of resources. Since a payload size is 20 bits in a PUCCH format 2, the payload size can be increased to 40 bits when using two resources (i.e., $I_{CS1}$ and $I_{CS2}$).

When a 40-bit encoded bit is QPSK-modulated, 20 modulation symbols d(0), d(1), ... d(19) are generated.

20 cyclically shifted sequences $r(n, I_{CS})$ are required in each OFDM symbol. Among them, 10 sequences can be acquired by using the $1^{st}$ PUCCH resource $I_{CS1}$, and the remaining 10 sequences can be obtained by using the $2^{nd}$ PUCCH resource $I_{CS2}$.

For convenience, r(0), r(1), ..., r(9) denote a CS sequence corresponding to a $1^{st}$ symbol to a $10^{th}$ OFDM symbol respectively (herein, an OFDM symbol to which a reference signal is mapped in a subframe is excluded) and acquired by using the $1^{st}$ PUCCH resource $I_{CS1}$. Assume that r(10), r(11), ..., r(19) denote a CS sequence corresponding to a $1^{st}$ symbol to a $10^{th}$ OFDM symbol respectively and acquired by using the $2^{nd}$ PUCCH resource $I_{CS1}$.

d(0)r(0)+d(10)r(10) is transmitted through an antenna in a $1^{st}$ OFDM symbol. d(1)r(1)+d(11)r(11) is transmitted through an antenna in a $2^{nd}$ OFDM symbol. The remaining OFDM symbols are transmitted as shown in FIG. 9.

The sequence d(0), d(1), ..., d(19) can be expressed by a mapping rule using a mapping Table such as Table 4 below.

TABLE 4

| Encoded Bits | $I_{cs1}$ | | $I_{cs2}$ | |
|---|---|---|---|---|
| b(0), b(1), b2(2), b(3) | I | Q | I | Q |
| 0000 | $-1/\sqrt{2}$ | $-1/\sqrt{2}$ | 0 | 0 |
| 0001 | $-1/\sqrt{2}$ | 0 | 0 | $-1/\sqrt{2}$ |
| 0010 | 0 | $-1/\sqrt{2}$ | $-1/\sqrt{2}$ | 0 |
| 0011 | 0 | 0 | $-1/\sqrt{2}$ | $-1/\sqrt{2}$ |
| 0100 | $-1/\sqrt{2}$ | 0 | 0 | $1/\sqrt{2}$ |

TABLE 4-continued

| Encoded Bits | $I_{cs1}$ | | $I_{cs2}$ | |
| b(0), b(1), b2(2), b(3) | I | Q | I | Q |
| --- | --- | --- | --- | --- |
| 0101 | $-1/\sqrt{2}$ | $1/\sqrt{2}$ | 0 | 0 |
| 0110 | 0 | 0 | $-1/\sqrt{2}$ | $1/\sqrt{2}$ |
| 0111 | 0 | $1/\sqrt{2}$ | $-1/\sqrt{2}$ | 0 |
| 1000 | 0 | $-1/\sqrt{2}$ | $1/\sqrt{2}$ | 0 |
| 1001 | 0 | 0 | $1/\sqrt{2}$ | $-1/\sqrt{2}$ |
| 1010 | $1/\sqrt{2}$ | $-1/\sqrt{2}$ | 0 | 0 |
| 1011 | $1/\sqrt{2}$ | 0 | 0 | $-1/\sqrt{2}$ |
| 1100 | 0 | 0 | $1/\sqrt{2}$ | $1/\sqrt{2}$ |
| 1101 | 0 | $1/\sqrt{2}$ | $1/\sqrt{2}$ | 0 |
| 1110 | $1/\sqrt{2}$ | 0 | 0 | $1/\sqrt{2}$ |
| 1111 | $1/\sqrt{2}$ | $1/\sqrt{2}$ | 0 | 0 |

According to the MSM, a payload of the PUCCH can be increased by using a plurality of PUCCH resources.

The MSM can be combined with the OSRSM. $I_{CS1}$ is transmitted via a $1^{st}$ antenna, and $I_{CS2}$ is transmitted via a $2^{nd}$ antenna.

Figure 10:
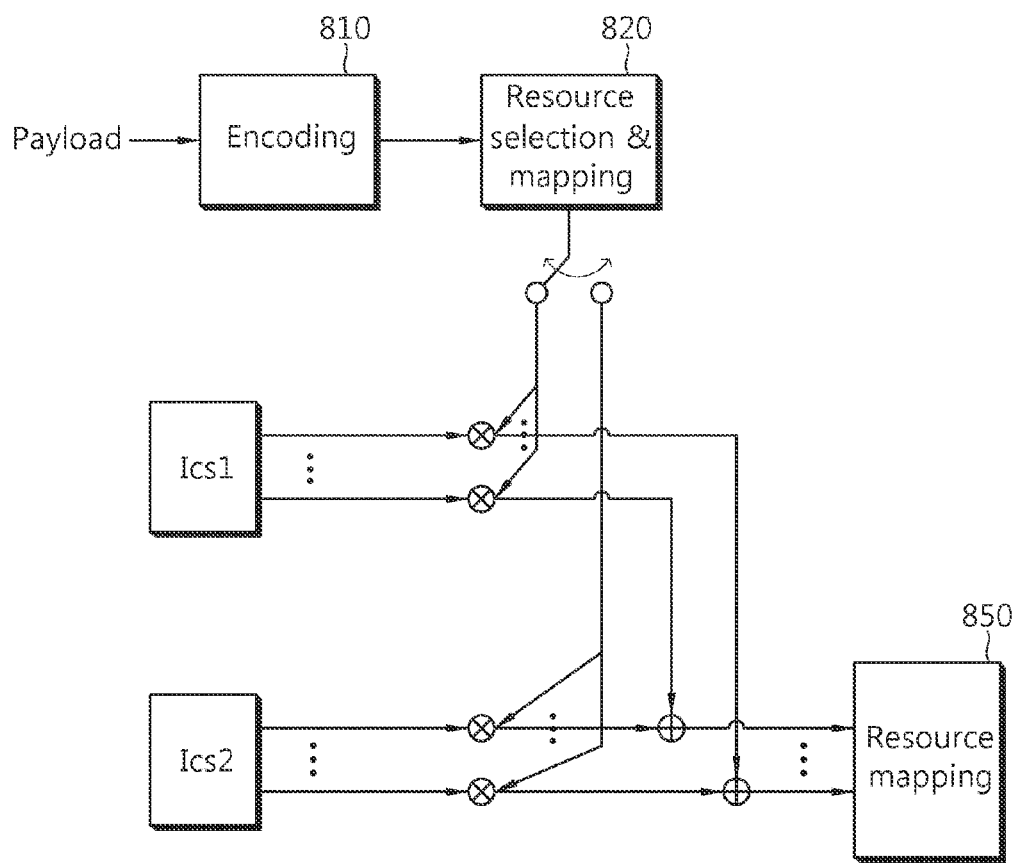
FIG. 10 is a block diagram showing PUCCH transmission using resource selection.

FIG. 10 is a block diagram showing PUCCH transmission using resource selection. In comparison with the MSM, the resource selection uses only some of allocated resources in PUCCH transmission. If two resources $I_{CS1}$ and $I_{CS2}$ are allocated, one of the resources $I_{CS1}$ and $I_{CS2}$ is used in PUCCH transmission.

A payload is encoded by an encoder 810 to become an encoded bit. There is no restriction on an encoding scheme, and well-know schemes can be used such as block coding, convolutional coding, tail-biting convolutional coding (TBCC), turbo coding, etc.

The encoded bit is converted into a modulation symbol by applying a mapping rule that combines resource selection using a plurality of resources allocated by a mapper 820 and a modulation scheme. If the encoded bit is m bits, a plurality of CS indices corresponding to n (n≥1) bits among the m bits and a $2^{(m-n)}$ order phase shift keying (PSK) (or quadrature amplitude modulation (QAM)) corresponding to (m−n) bits can be applied.

When two CS indices $I_{CS1}$ and $I_{CS2}$ are assigned, the modulation symbol can correspond to a $1^{st}$ CS index $I_{CS1}$ or a $2^{nd}$ CS index $I_{CS2}$. That is, a resource to be used is selected when converted into the modulation symbol.

The modulation symbol is spread to a sequence in association with its corresponding CS index, thereby generating a spread sequence. The spread sequence is a sequence having a complex-valued element by multiplying the modulation symbol by a CS sequence. The spread sequence is transmitted by being mapped to a physical resource by a resource mapper 850. For example, if 0≤n≤11, the spread sequence is s(i)=d(i) r(n, $I_{CS}$)={d(i)r(0, $I_{CS}$), d(i)r(1, $I_{CS}$), . . . , d(i)r(11, $I_{CS}$)}, and is transmitted by being mapped to each subcarrier of an RB corresponding to each element d(i)r(n, $I_{CS}$) of the spread sequence.

Figure 11:
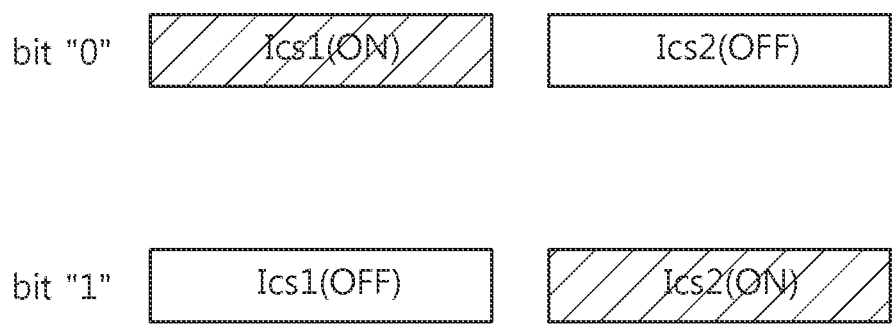
FIG. 11 shows a bit expression when two resources are allocated.

The resource selection expresses a bit according to whether a resource is used. FIG. 11 shows a bit expression when two resources are allocated. When $I_{CS1}$ and $I_{CS2}$ are assigned, an information bit of '0' or '1' can be expressed according to ON/OFF of $I_{CS1}$ or $I_{CS2}$. Although it is shown herein that the bit '0' expresses ON of $I_{CS1}$ and OFF of $I_{CS2}$ and the bit '1' expresses OFF of $I_{CS1}$ and ON of $I_{CS2}$, the bit value and a resource order are for exemplary purposes only.

Table 5 below shows an example of mapping between a bit encoded using resource selection and a modulation symbol when two CS indices $I_{CS1}$ and $I_{CS2}$ are assigned and QPSK mapping is used.

TABLE 5

| Encoded Bits | $I_{cs1}$ | | $I_{cs2}$ | |
| b(0), b(1), b(2) | I | Q | I | Q |
| --- | --- | --- | --- | --- |
| 000 | $-1/\sqrt{2}$ | $-1/\sqrt{2}$ | | |
| 001 | | | $-1/\sqrt{2}$ | $-1/\sqrt{2}$ |
| 010 | $-1/\sqrt{2}$ | $1/\sqrt{2}$ | | |
| 011 | | | $-1/\sqrt{2}$ | $1/\sqrt{2}$ |
| 100 | | | $1/\sqrt{2}$ | $-1/\sqrt{2}$ |
| 101 | $1/\sqrt{2}$ | $-1/\sqrt{2}$ | | |
| 110 | | | $1/\sqrt{2}$ | $1/\sqrt{2}$ |
| 111 | $1/\sqrt{2}$ | $1/\sqrt{2}$ | | |

Figure 12:
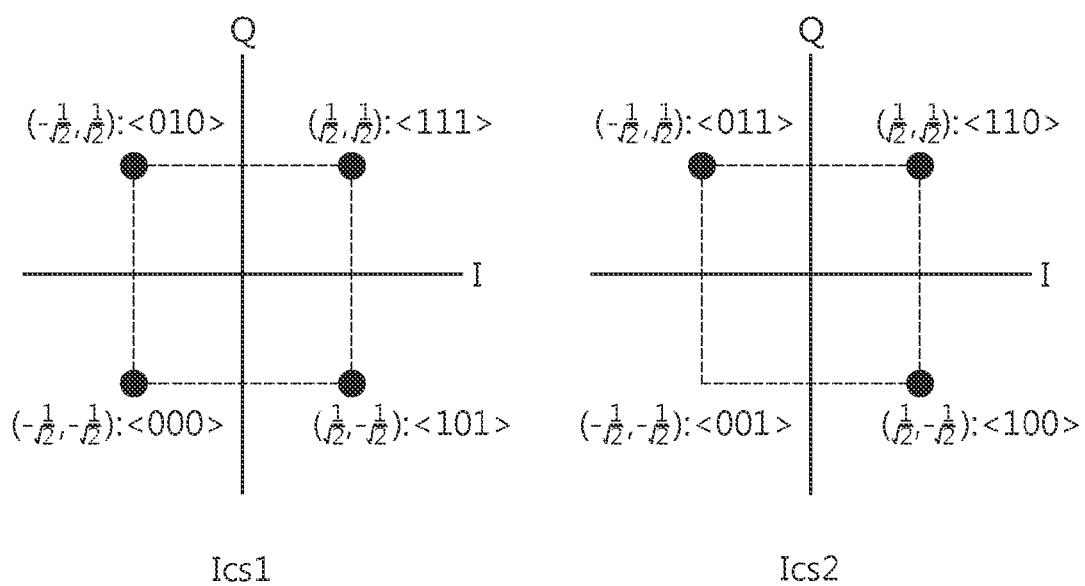
FIG. 12 shows a constellation according to a mapping rule of Table 5.

FIG. 12 shows a constellation according to a mapping rule of Table 5.

The mapping rule is designed by considering a Euclidean distance. The Euclidean distance is the greatest in the diagonal of the constellation. For example, the Euclidean distance of (1/sqrt(2), 1/sqrt(2)) and (−1/sqrt(2), −1/sqrt(2)) is the greatest. The greater the Euclidean distance, the smaller the possibility of error occurrence. Therefore, a bit having the greatest Hamming distance is located at a position having the greatest Euclidean distance.

CS indices $I_{CS1}$ and $I_{CS2}$ can use symbol level hopping and/or slot level hopping. This implies that a CS index can be used by changing on a symbol basis and/or on a slot basis according to an assigned CS index. For example, <$I_{CS2}$, $I_{CS2}$, $I_{CS2}$, $I_{CS2}$, $I_{CS1}$> selected in the aforementioned example can be used as <$I_{CS2}$(0), $I_{CS2}$(1), $I_{CS2}$(2), $I_{CS2}$(3), $I_{CS1}$(4)> by performing symbol level hopping. $I_{CS2}$(m) denotes a CS index obtained for an $m^{th}$ OFDM symbol based on $I_{CS2}$.

Hereinafter, symbol/slot level hopping of a CS index is omitted for clarity of description. Therefore, $I_{CS2}$(m) can be simply expressed by $I_{CS2}$.

Now, an example of applying resource selection will be described in greater detail.

The following information bits (14 bits) are taken into consideration.

<1, 1, 0, 0, 0, 0, 0, 0, 0, 1, 0, 0, 0, 0>

Tail-biting convolutional coding (TBCC) defined in 3GPP LTE can be applied to the information bits (14 bits) to generate encoded bits (42 bits) as follows.

<0, 1, 1, 0, 1, 1, 1, 0, 0, 0, 0, 1, 1, 1, 1, 1, 0, 1, 0, 1, 1, 1, 1, 1, 0, 0, 0, 1, 1, 1, 0, 1, 1, 1, 1, 1, 1, 0, 0, 0, 1>

Circular buffer rate matching can be performed on the encoded bits (42 bits) to generate rate-matched bits (30 bits) as follows.

<1, 0, 1, 0, 1, 1, 0, 0, 1, 0, 0, 0, 1, 1, 1, 0, 1, 1, 1, 0, 0, 1, 0, 1, 1, 0, 1, 1, 1, 1>

Modulation can be performed on the rate-matched bits (30 bits) according to Table 5 above to generate 10 modulation symbols d(0), . . . , d(9) as shown in Table 6 below.

TABLE 6

| | | d(0) | d(1) | d(2) | d(3) | d(4) |
| --- | --- | --- | --- | --- | --- | --- |
| $I_{cs1}$ | I | $1/\sqrt{2}$ | 0 | 0 | $-1/\sqrt{2}$ | $1/\sqrt{2}$ |
| | Q | $-1/\sqrt{2}$ | 0 | 0 | $-1/\sqrt{2}$ | $1/\sqrt{2}$ |
| $I_{cs2}$ | I | 0 | $-1/\sqrt{2}$ | $-1/\sqrt{2}$ | 0 | 0 |
| | Q | 0 | $1/\sqrt{2}$ | $-1/\sqrt{2}$ | 0 | 0 |
| | | d(5) | d(6) | d(7) | d(8) | d(9) |
| $I_{cs1}$ | I | 0 | 0 | $1/\sqrt{2}$ | $1/\sqrt{2}$ | $1/\sqrt{2}$ |
| | Q | 0 | 0 | $-1/\sqrt{2}$ | $-1/\sqrt{2}$ | $1/\sqrt{2}$ |
| $I_{cs2}$ | I | $-1/\sqrt{2}$ | $1/\sqrt{2}$ | 0 | 0 | 0 |
| | Q | $1/\sqrt{2}$ | $-1/\sqrt{2}$ | 0 | 0 | 0 |

By using the modulation symbols, it can be expressed as a spread sequence s(0), . . . , s(9) for the PUCCH format 2 as follows.

{s(0),s(1), . . . ,s(9)}={d(0)r(n,$I_{CS1}$),d(1)r(n,$I_{CS2}$),d(2)
r(n,$I_{CS2}$),d(3)r(n,$I_{CS1}$),d(4)r(n,$I_{CS1}$),d(5)r(n,$I_{CS2}$),
d(6)r(n,$I_{CS2}$),d(7)r(n,$I_{CS1}$),d(8)r(n,$I_{CS1}$),d(9)r(n,
$I_{CS1}$)}

Table 7 below shows an example of mapping between a modulation symbol and a bit encoded using resource selection when two CS indices $I_{CS1}$ and $I_{CS2}$ are assigned and when 8PSK mapping is used.

TABLE 7

| Encoded Bits | $I_{cs1}$ | | $I_{cs2}$ | |
|---|---|---|---|---|
| b(0), b(1), b(2) | I | Q | I | Q |
| 0000 | $-1/\sqrt{2}$ | $-1/\sqrt{2}$ | | |
| 0001 | $-1$ | 0 | | |
| 0010 | | | $-1$ | 0 |
| 0011 | | | $-1/\sqrt{2}$ | $-1/\sqrt{2}$ |
| 0100 | | | 0 | 1 |
| 0101 | $-1/\sqrt{2}$ | $1/\sqrt{2}$ | 0 | 0 |
| 0110 | | | $-1/\sqrt{2}$ | $1/\sqrt{2}$ |
| 0111 | 0 | 1 | | |
| 1000 | 0 | $-1$ | | |
| 1001 | | | $1/\sqrt{2}$ | $-1/\sqrt{2}$ |
| 1010 | $-1/\sqrt{2}$ | $-1/\sqrt{2}$ | | |
| 1011 | | | 0 | $-1$ |
| 1100 | | | $1/\sqrt{2}$ | $1/\sqrt{2}$ |
| 1101 | | | 1 | 0 |
| 1110 | 1 | 0 | | |
| 1111 | $1/\sqrt{2}$ | $1/\sqrt{2}$ | | |

Figure 13:
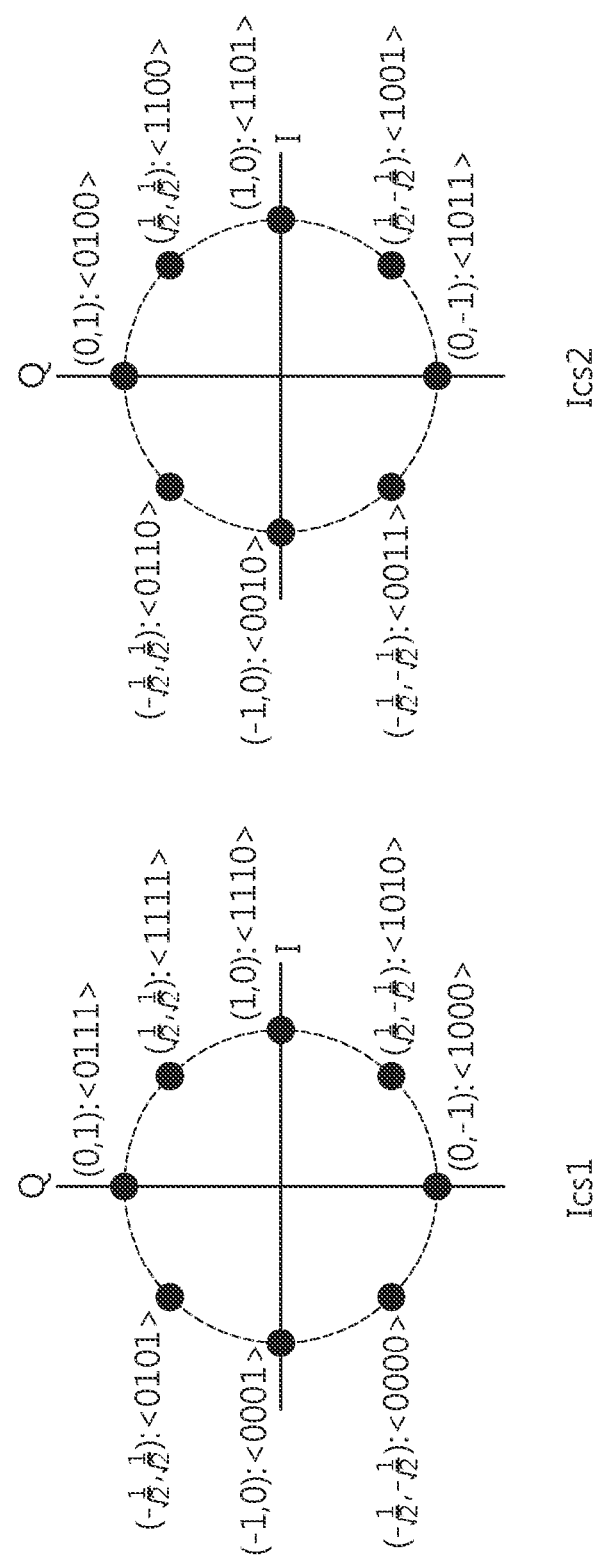
FIG. 13 shows a constellation according to a mapping rule of Table 7.

FIG. 13 shows a constellation according to a mapping rule of Table 7.

The following information bits (14 bits) are taken into consideration.

<1, 0, 1, 1, 1, 0, 0, 1, 0, 1, 1, 1, 1, 1>

TBCC can be applied to the information bits (14 bits) to generate encoded bits (42 bits) as follows.

<0, 0, 0, 0, 0, 0, 1, 0, 0, 0, 0, 0, 0, 0, 1, 0, 0, 1, 1, 1, 1, 1, 0, 0, 0, 0, 1, 0, 1, 1, 1, 1, 0, 1, 0, 1, 0, 0, 0, 1, 0, 1, 1>

Circular buffer rate matching can be performed on the encoded bits (42 bits) to generate rate-matched bits (40 bits) as follows.

<1, 0, 0, 0, 0, 0, 0, 1, 1, 1, 0, 0, 0, 0, 0, 0, 1, 0, 1, 0, 1, 1, 0, 0, 0, 0, 0, 0, 0, 0, 0, 1, 1, 1, 1, 0, 1, 0, 1>

Modulation can be performed on the rate-matched bits (40 bits) according to Table 7 above to generate 10 modulation symbols d(0), . . . ,d(9) as shown in Table 8 below.

TABLE 8

| | | d(0) | d(1) | d(2) | d(3) | d(4) |
|---|---|---|---|---|---|---|
| $I_{cs1}$ | I | 0 | $-1$ | 0 | $-1/\sqrt{2}$ | $1/\sqrt{2}$ |
| | Q | $-1$ | 0 | 0 | $-1/\sqrt{2}$ | $-1/\sqrt{2}$ |
| $I_{cs2}$ | I | 0 | 0 | $1/\sqrt{2}$ | 0 | 0 |
| | Q | 0 | 0 | $1/\sqrt{2}$ | 0 | 0 |

| | | d(5) | d(6) | d(7) | d(8) | d(9) |
|---|---|---|---|---|---|---|
| $I_{cs1}$ | I | 0 | $-1/\sqrt{2}$ | $-1/\sqrt{2}$ | $1/\sqrt{2}$ | $-1/\sqrt{2}$ |
| | Q | 0 | $-1/\sqrt{2}$ | $-1/\sqrt{2}$ | $1/\sqrt{2}$ | $1/\sqrt{2}$ |
| $I_{cs2}$ | I | $-1/\sqrt{2}$ | 0 | 0 | 0 | 0 |
| | Q | $-1/\sqrt{2}$ | 0 | 0 | 0 | 0 |

By using the modulation symbols, it can be expressed as a spread sequence s(0), . . . , s(9) for the PUCCH format 2 as follows.

{s(0),s(1), . . . ,s(9)}={d(0)r(n,$I_{CS1}$),d(1)r(n,$I_{CS1}$),d(2)
r(n,$I_{CS2}$),d(3)r(n,$I_{CS1}$),d(4)r(n,$I_{CS1}$),d(5)r(n,$I_{CS2}$),
d(6)r(n,$I_{CS1}$),d(7)r(n,$I_{CS1}$),d(8)r(n,$I_{CS1}$),d(9)r(n,
$I_{CS1}$)}

The MSM and the resource selection can apply to multiple antennas together with precoding, and this is called space-code block coding (SCBC).

Figure 14:
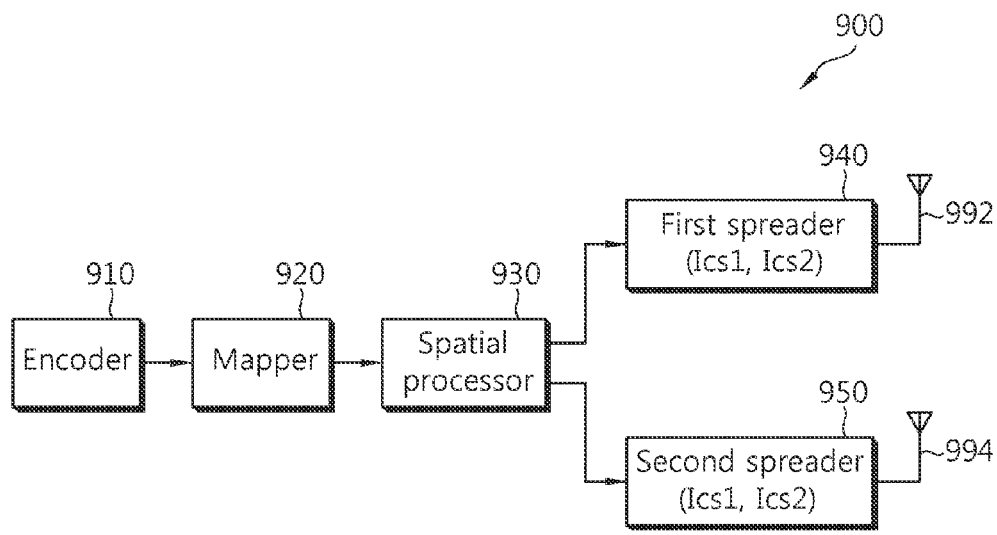
FIG. 14 is a block diagram of a transmitter for implementing SCBC.
Figure 14:
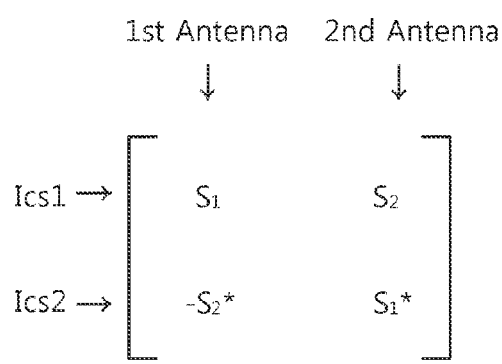

FIG. 14 is a block diagram of a transmitter for implementing SCBC.

A transmitter 900 includes an encoder 910, a mapper 920, a spatial processor 930, a first spreader 940, a second spreader 950, and two antennas 992 and 994. The transmitter 900 may be a part of a UE. Parts other than the antennas 992 and 994 can be implemented by a processor.

The encoder 910 receives an information bit to generate encoded bits. The mapper 920 maps the encoded bit on a constellation to generate a modulation symbol. The mapper 920 can perform mapping on typical QPSK or 8PSK (or higher order), or can generate a modulation symbol on a constellation according to a mapping rule by using the aforementioned MSM and/or resource selection.

The spatial processor 930 performs SCBC processing on the modulation symbol, and sends the processed symbols to the first spreader 940 and the second spreader 950. The first spreader 940 and the second spreader 950 spread the processed symbols by using an index which is cyclically shifted by a CS index. A spread sequence generated by the first spreader 940 is transmitted through the first transmit antenna 992. A spread sequence generated by the second spreader 950 is transmitted through the second transmit antenna 994.

Equation 3 below shows an example of SCBC.

$$\begin{bmatrix} s_1 & s_2 \\ -s_2^* & s_1^* \end{bmatrix} \quad \text{[Equation 3]}$$

Each row of an SCBC matrix indicates a resource (e.g., a CS index) and each column indicates an antenna. Although $s_1$ and $s_2$ denote a modulation symbol, they may denote a spread sequence.

In the SCBC matrix, a $1^{st}$ column indicates a $1^{st}$ antenna, and a $2^{nd}$ column indicates a $2^{nd}$ antenna. $s_1$ of the $1^{st}$ column indicates a modulation symbol corresponding to a $1^{st}$ CS index in the $1^{st}$ antenna. $-s_2^*$ of the $2^{nd}$ column indicates a negative complex conjugate modulation symbol corresponding to a $2^{nd}$ CS index in the $1^{st}$ antenna. Orders of $s_1$ and $s_2$ change in the $2^{nd}$ column, which implies that a CS index in the $1^{st}$ antenna and a CS index in the $2^{nd}$ antenna are swapped to each other.

SCBC is a process in which a resource corresponding to a transmission symbol of the $1^{st}$ antenna and a resource corresponding to a modulation symbol of the $2^{nd}$ antenna are swapped to each other, and a modulation symbol is processed to have a complex conjugate or negative complex conjugation relation between the $1^{st}$ antenna and the $2^{nd}$ antenna.

As shown in the lower portion of FIG. 14, assume that d(0) corresponding to a $2^{nd}$ CS index $I_{CS2}$ is output by the mapper 920. When applying the SCBC of Equation 3, a spread sequence of $-d(0)^* r(n, I_{CS2})$ is transmitted through the $1^{st}$ antenna, and a spread sequence of $d(0)r(n, I_{CS1})$ is transmitted through the $2^{nd}$ antenna.

When applying the SCBC of Equation 3, modulation symbols based on Table 8 above can be represented by a spread sequence per antenna as follows.

$\{s^1(0),s^1(1),\ldots,s^1(9)\}=\{d(0)r(n,I_{CS1}),d(1)r(n,I_{CS1}),$
$-d(2)*r(n,I_{CS2}),d(3)r(n,I_{CS1}),d(4)r(n,I_{CS1}),-d(5)*r$
$(n,I_{CS2}),d(6)r(n,I_{CS1}),d(7)r(n,I_{CS1}),d(8)r(n,I_{CS1}),$
$d(9)r(n,I_{CS1})\}$ First antenna:

$\{s^2(0),s^2(1),\ldots,s^2(9)\}=\{d(0)*r(n,I_{CS2}),d(1)*r(n,$
$I_{CS2}),d(2)r(n,I_{CS1}),d(3)*r(n,I_{CS2}),d(4)*r(n,I_{CS2}),d$
$(5)r(n,I_{CS1}),d(6)*r(n,I_{CS2}),d(7)*r(n,I_{CS2}),d(8)*r$
$(n,I_{CS2}),d(9)*r(n,I_{CS2})\}$ Second antenna:

Table 9 below shows examples of various SCBC matrices.

TABLE 9

| (1) | $\begin{pmatrix} s_1 & s_2 \\ -s_2^* & s_1^* \end{pmatrix}$ | (2) | $\begin{pmatrix} s_1 & -s_2 \\ s_2^* & s_1^* \end{pmatrix}$ |
|---|---|---|---|
| (3) | $\begin{pmatrix} s_1^* & s_2 \\ -s_2^* & s_1 \end{pmatrix}$ | (4) | $\begin{pmatrix} s_1^* & -s_2 \\ s_2^* & s_1 \end{pmatrix}$ |
| (5) | $\begin{pmatrix} s_1 & s_2^* \\ -s_2 & s_1^* \end{pmatrix}$ | (6) | $\begin{pmatrix} s_1 & -s_2^* \\ s_2 & s_1^* \end{pmatrix}$ |
| (7) | $\begin{pmatrix} s_1^* & s_2^* \\ -s_2 & s_1 \end{pmatrix}$ | (8) | $\begin{pmatrix} s_1^* & -s_2^* \\ s_2 & s_1 \end{pmatrix}$ |
| (9) | $\begin{pmatrix} s_1 & s_2 \\ s_2^* & -s_1^* \end{pmatrix}$ | (10) | $\begin{pmatrix} -s_1 & s_2 \\ s_2^* & s_1^* \end{pmatrix}$ |
| (11) | $\begin{pmatrix} s_1 & s_2^* \\ s_2 & -s_1^* \end{pmatrix}$ | (12) | $\begin{pmatrix} -s_1 & s_2^* \\ s_2 & s_1^* \end{pmatrix}$ |
| (13) | $\begin{pmatrix} s_1^* & s_2 \\ s_2^* & -s_1 \end{pmatrix}$ | (14) | $\begin{pmatrix} -s_1^* & s_2 \\ s_2^* & s_1 \end{pmatrix}$ |
| (15) | $\begin{pmatrix} s_1^* & s_2^* \\ s_2 & -s_1 \end{pmatrix}$ | (16) | $\begin{pmatrix} -s_1^* & s_2^* \\ s_2 & s_1 \end{pmatrix}$ |

Figure 15:
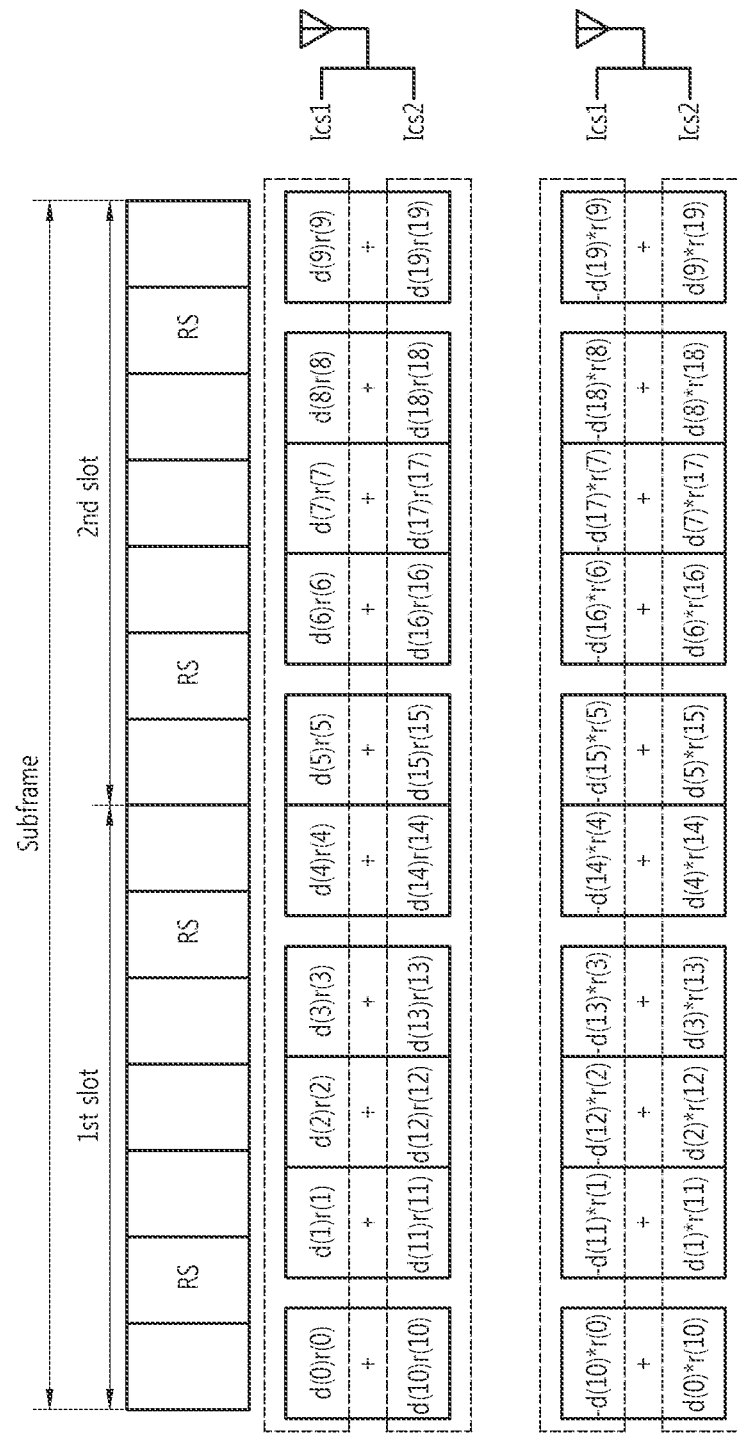
FIG. 15 shows an example of applying SCBC.

FIG. 15 shows an example of applying SCBC. Herein, SCBC (6) of Table 9 is applied to MSM.

Table 10 below shows another example of available SCBC. Herein, some elements of an SCBC matrix are set to 0. That is, the SCBC is processed for each corresponding resource between the two allocated resources.

TABLE 10

| (1) | $\begin{pmatrix} s_1 & 0 \\ 0 & s_1^* \end{pmatrix}$ | (2) | $\begin{pmatrix} s_1^* & 0 \\ 0 & s_1 \end{pmatrix}$ |
|---|---|---|---|
| (3) | $\begin{pmatrix} s_1 & 0 \\ 0 & -s_1^* \end{pmatrix}$ | (4) | $\begin{pmatrix} s_1^* & 0 \\ 0 & -s_1 \end{pmatrix}$ |
| (5) | $\begin{pmatrix} -s_1 & 0 \\ 0 & s_1^* \end{pmatrix}$ | (6) | $\begin{pmatrix} -s_1^* & 0 \\ 0 & s_1 \end{pmatrix}$ |
| (7) | $\begin{pmatrix} 0 & s_2 \\ -s_2^* & 0 \end{pmatrix}$ | (8) | $\begin{pmatrix} 0 & s_2^* \\ -s_2 & 0 \end{pmatrix}$ |
| (9) | $\begin{pmatrix} 0 & -s_2 \\ s_2^* & 0 \end{pmatrix}$ | (10) | $\begin{pmatrix} 0 & -s_2^* \\ s_2 & 0 \end{pmatrix}$ |
| (11) | $\begin{pmatrix} 0 & s_2 \\ s_2^* & 0 \end{pmatrix}$ | (12) | $\begin{pmatrix} 0 & s_2^* \\ s_2 & 0 \end{pmatrix}$ |

The SCBC can acquire a full spatial diversity gain by using an optional transmit method. However, since paring of two resources is necessary for two antennas, it is difficult to apply the SCBC to an odd number of resources.

Figure 16:
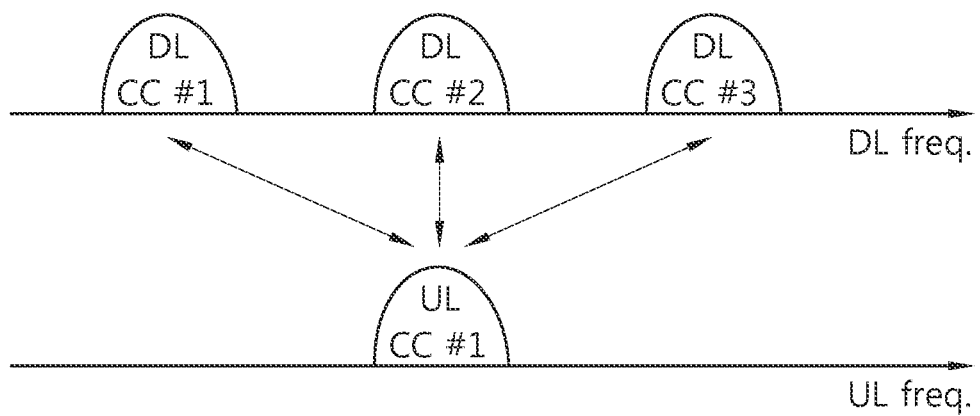
FIG. 16 shows an example of an asymmetric multi-carrier.

FIG. 16 shows an example of an asymmetric multi-carrier. Although it is shown that a multi-carrier system consists of 3 downlink component carriers (i.e., CC #1, DL CC #2, DL CC #3) and one uplink component carrier (i.e., UL CC #1) for example, the number of DL CCs and the number of UL CCs are not limited thereto.

Assume that a CQI is transmitted for each DL CC. Three PUCCH resources corresponding to the respective DL CCs can be allocated, and the CQI can be fed back by using three resources by using multi-sequence transmission such as MSM.

Figure 17:
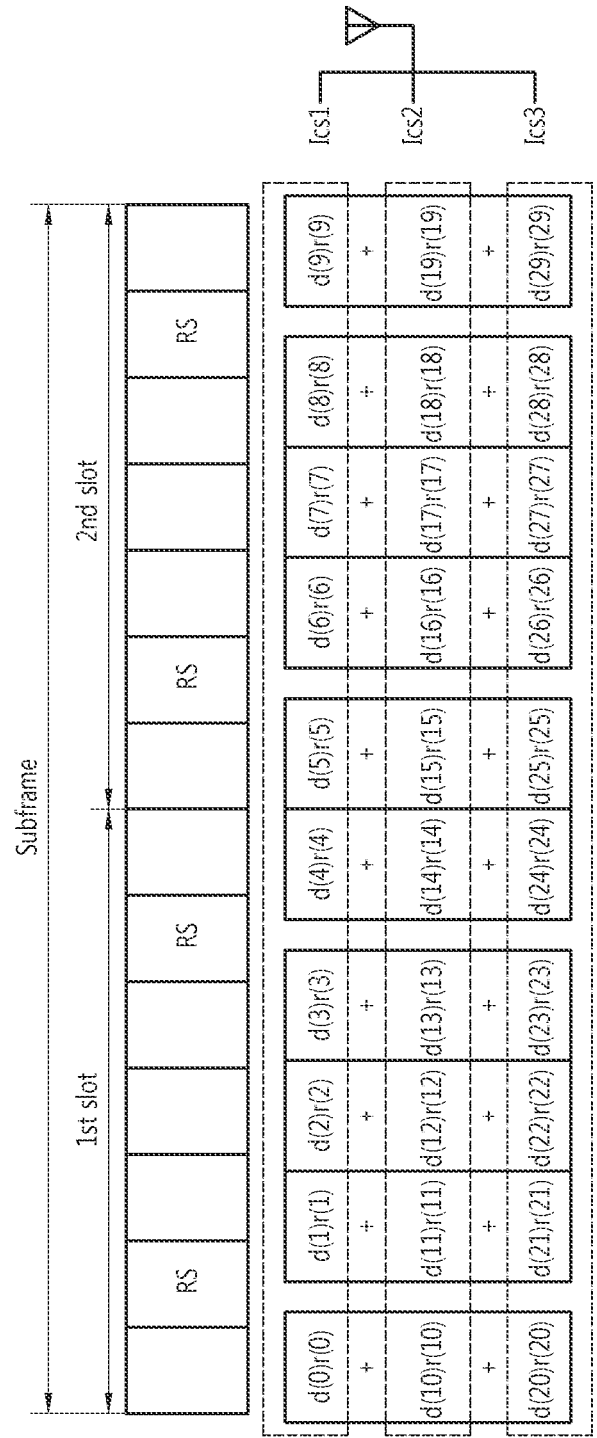
FIG. 17 shows transmission of a PUCCH format 2 using three resources in MSM.

FIG. 17 shows transmission of a PUCCH format 2 using three resources in MSM. Assume that the number of encoded bits of a CQI for three DL CCs is 60 bits. When using QPSK modulation, 30 modulation symbols d(0) to d(29) can be generated.

When the allocated three resources are three CS indices $I_{CS1}$, $I_{CS2}$, and $I_{CS3}$, for convenience, r(0), r(1), ..., r(9) are cyclically shifted sequences corresponding to a $1^{st}$ symbol to a $10^{th}$ OFDM symbol respectively (herein, an OFDM symbol to which a reference signal is mapped in a subframe is excluded) and obtained by using a $1^{st}$ PUCCH resource $I_{CS2}$. r(10), r(11), ..., r(19) are cyclically shifted sequences obtained by using a $2^{nd}$ PUCCH resource $I_{CS2}$. r(20), r(21), ..., r(29) are cyclically shifted sequences obtained by using a $3^{rd}$ PUCCH resource $I_{CS3}$.

d(0)r(0)+d(10)r(10)+d(20)r(20) is transmitted through an antenna in a $1^{st}$ OFDM symbol. d(1)r(1)+d(11)r(11)+d(21)r(10) is transmitted through an antenna in a $2^{nd}$ OFDM symbol. The remaining OFDM symbols are transmitted as shown in FIG. 9.

A plurality of resources can respectively use different modulation schemes. Two resources can use 8PSK modulation, and the remaining resources can use QPSK modulation.

Figure 18:
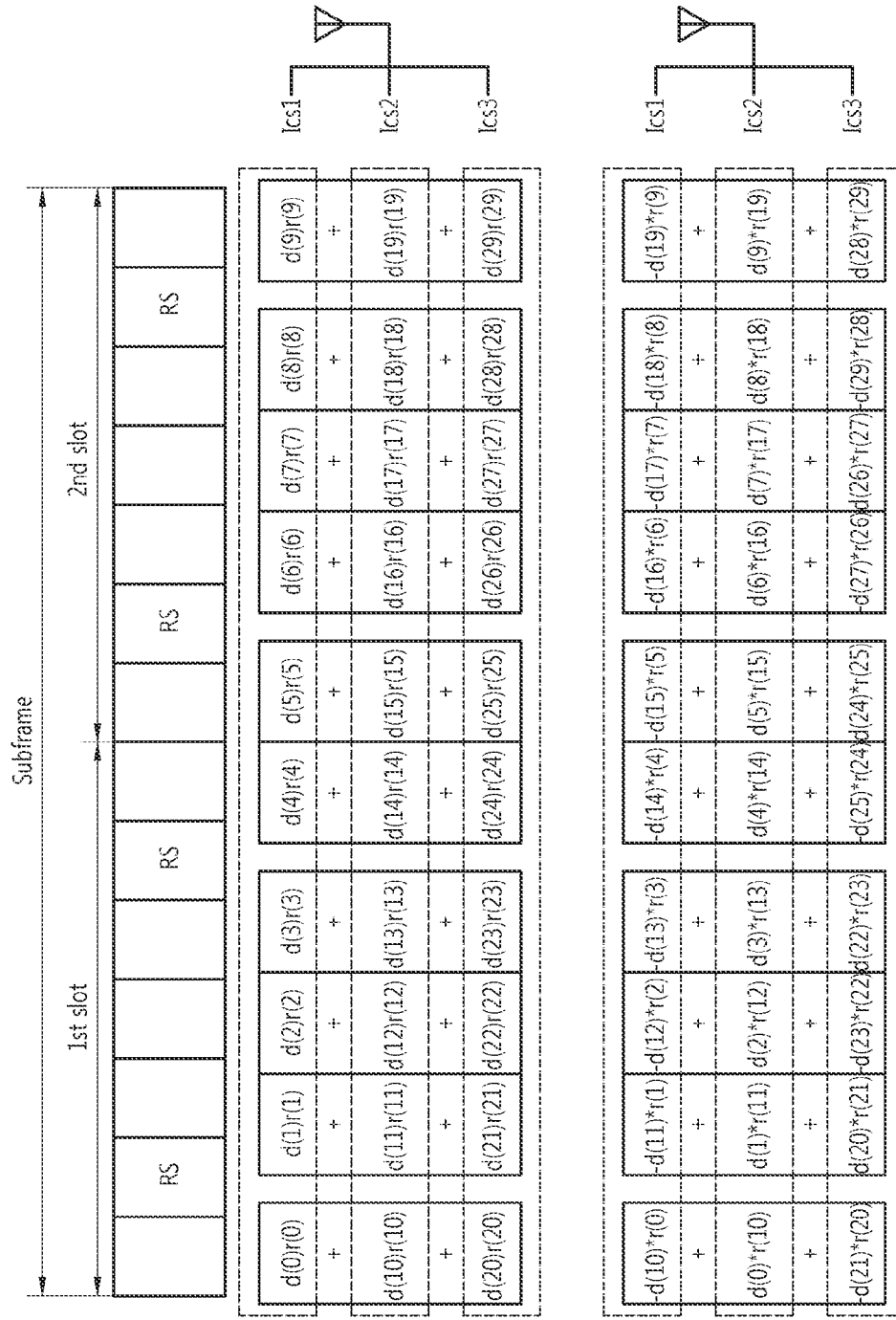
FIG. 18 shows an example of transmission of a PUCCH format 2 using three resources in SCBC.

FIG. 18 shows an example of transmission of a PUCCH format 2 using three resources in SCBC.

Regarding $I_{CS1}$ and $I_{CS2}$, SCBC (6) of Table 9 is applied according to Equation 4 below.

$$\begin{bmatrix} S_1 & -S_2^* \\ S_2 & S_1^* \end{bmatrix} \quad \text{[Equation 4]}$$

Regarding $I_{CS3}$, STBC having the same format as Equation 4 is applied. Each row of an STBC matrix indicates an OFDM symbol, and each column indicates an antenna.

A reference signal can be transmitted in an OSRT format to perform channel estimation for each antenna. If the number of antennas is 2, the reference signal is configured by using only two out of three resources.

When (k+1) resources are allocated (where k is an even number), SCBC can be applied to k resources, and regarding the remaining resources, different transmission diversity schemes (i.e., cyclic delay diversity (CDD), precoding vector switching (PVS), and/or simple repetition) can be applied in addition to the STBC. A CDD delay value in a unit of symbol or subframe or a precoding vector value of PVS can be predefined or can be reported by a BS to a UE.

Figure 19:
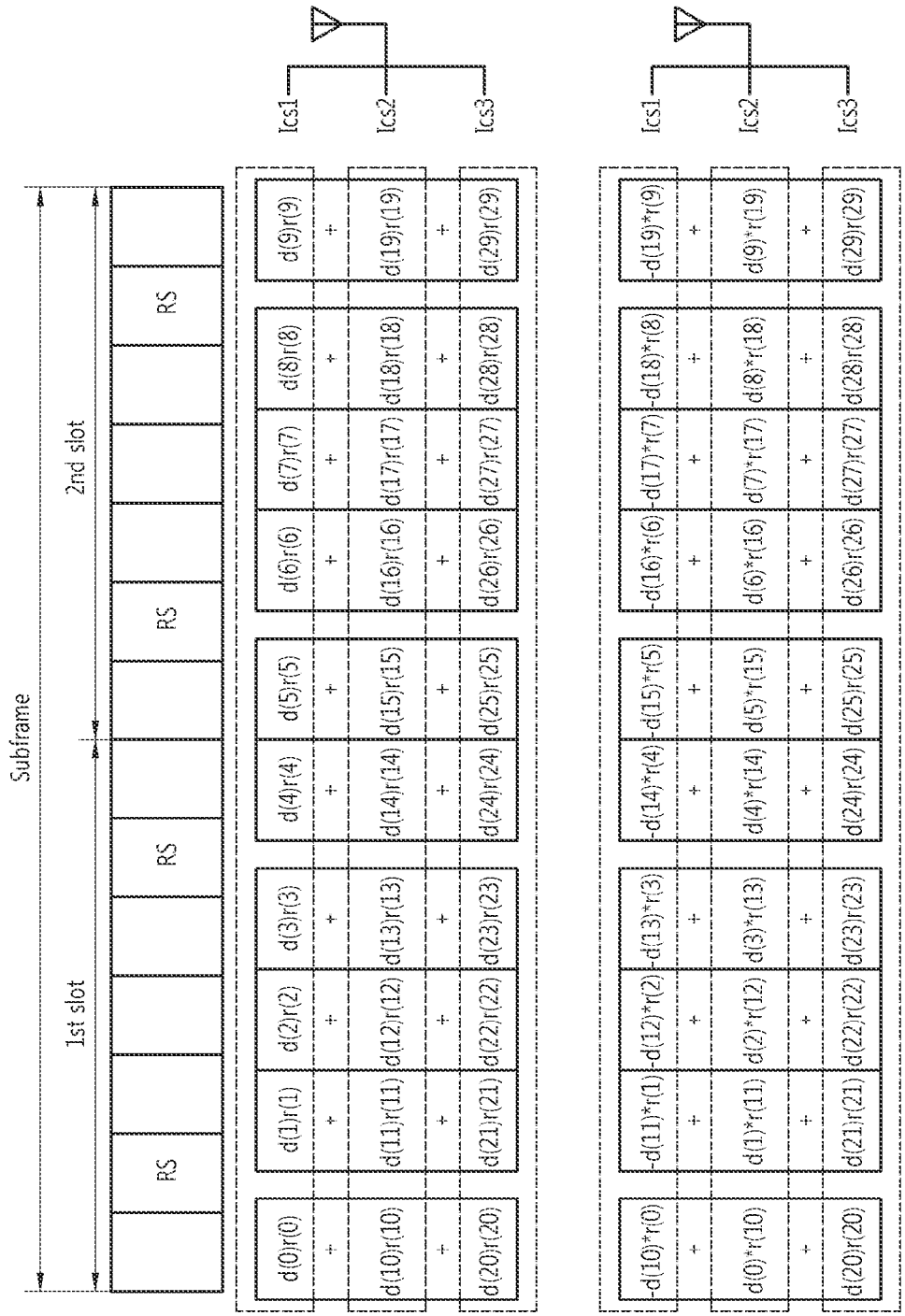
FIG. 19 shows another example of transmission of a PUCCH format 2 using three resources in SCBC.

FIG. 19 shows another example of transmission of a PUCCH format 2 using three resources in SCBC. In comparison with the embodiment of FIG. 18, simple repetition is applied for $I_{CS3}$. That is, regarding $I_{CS3}$, the same spread sequence is transmitted through a $1^{st}$ antenna and a $2^{nd}$ antenna.

Figure 20:
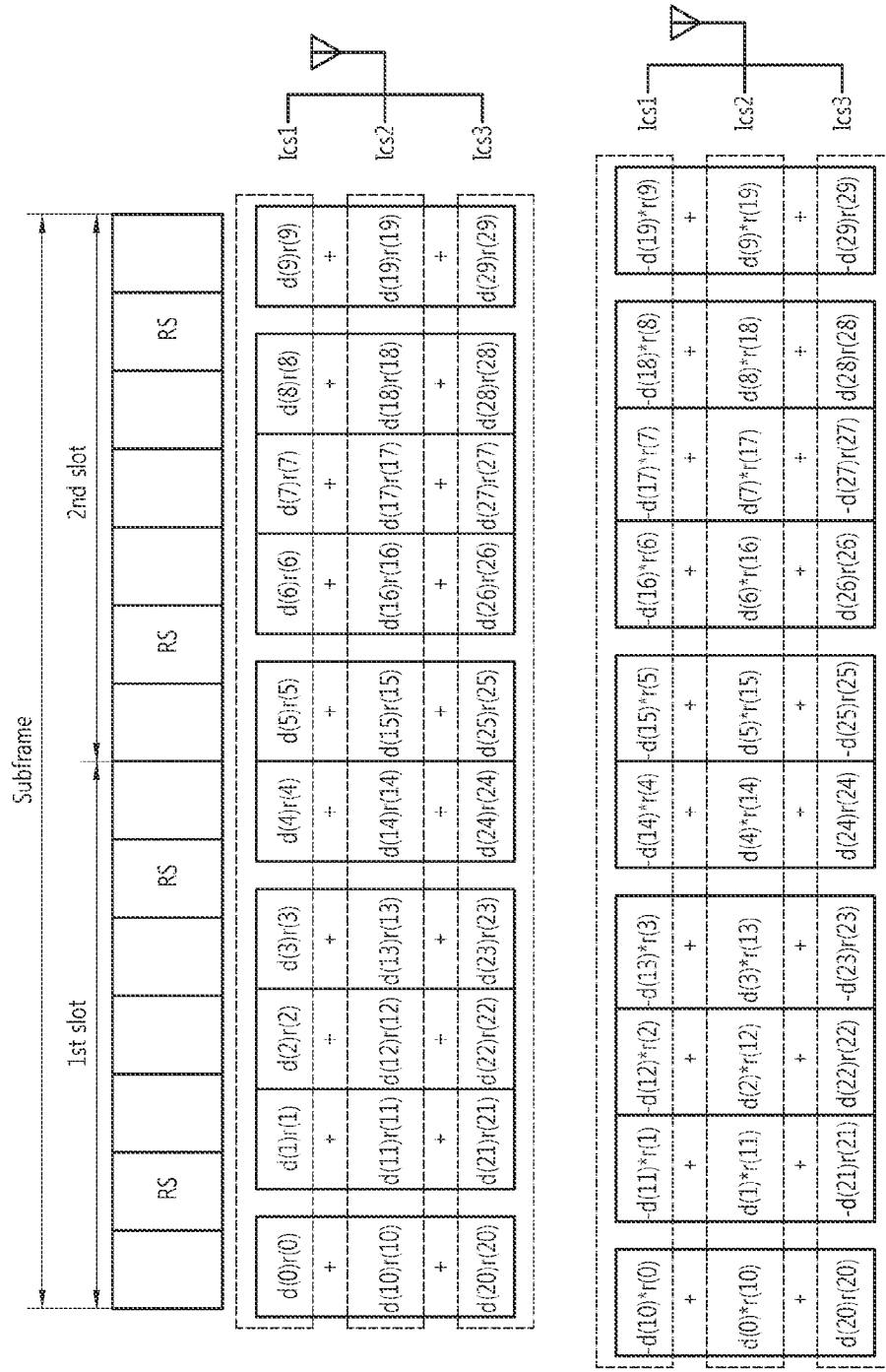
FIG. 20 shows another example of transmission of a PUCCH format 2 using 3 resources in SCBC.

FIG. 20 shows another example of transmission of a PUCCH format 2 using 3 resources in SCBC. In comparison with the embodiment of the FIG. 18, PVS is applied for $I_{CS3}$. As a precoding vector, $p(0)=[1\ 1]^T$ and $p(1)=[1\ -1]^T$ are used. $p(0)$ is used for a $1^{st}$ antenna, and $p(1)$ is used for a $2^{nd}$ antenna.

Precoding vectors are for exemplary purposes only, and thus other precoding vectors can also be used.

Now, application of space-frequency block code (SFBC) in the conventional PUCCH and PUSCH will be described.

Figure 21:
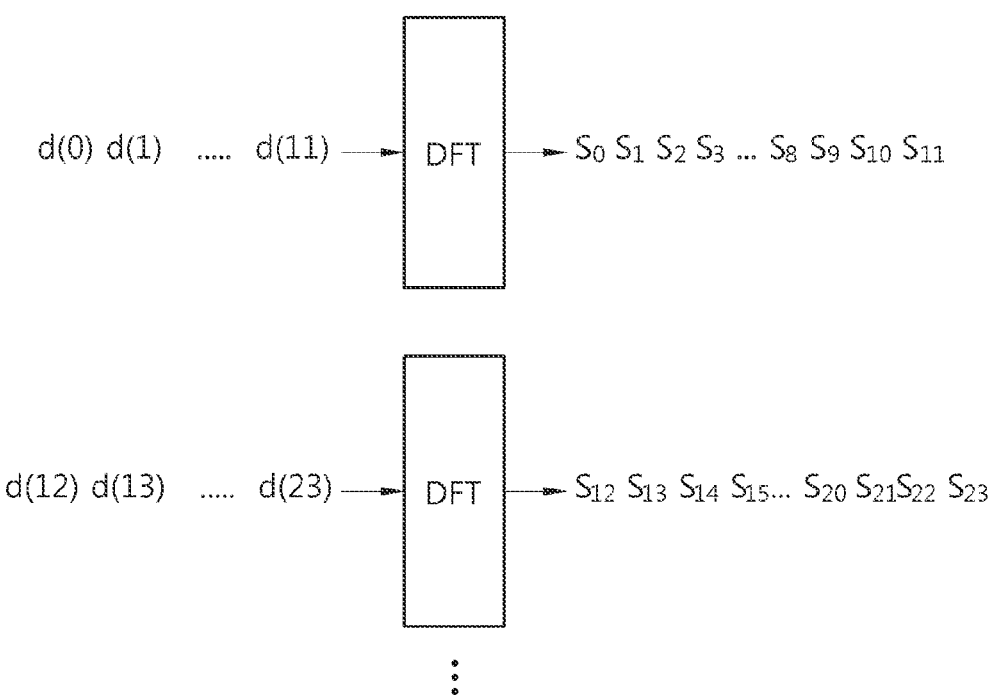
FIG. 21 shows 1-DFT spreading with a length of 12.

FIG. 21 shows 1-DFT spreading with a length of 12.

12 modulation symbols $d(0), d(1), \ldots, d(11)$ are DFT-spread to generate transmission symbols $S_0, S_1, \ldots, S_{11}$. Further, 12 modulation symbols $d(12), d(13), \ldots, d(23)$ are DFT-spread to generate transmission symbols $S_{12}, S_{13}, \ldots, S_{23}$.

Figure 22:
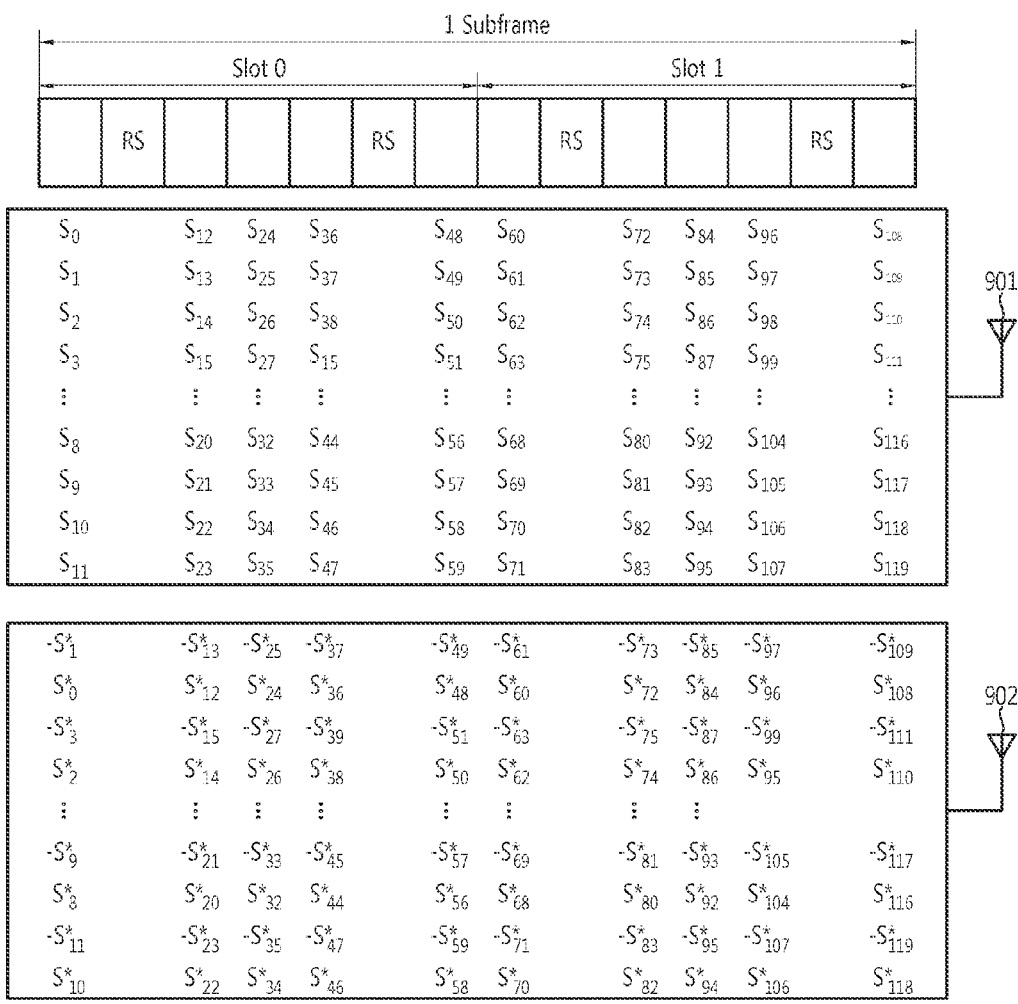
FIG. 22 shows an example of applying SFBC to a PUCCH.

FIG. 22 shows an example of applying SFBC to a PUCCH. An SFBC matrix of Equation 5 below is used.

$$\begin{bmatrix} S_i & -S_{i+1}^* \\ S_{i+1} & S_i^* \end{bmatrix}$$ [Equation 5]

Each row of the SFBC matrix indicates a frequency (e.g., subcarrier), and each column indicates an antenna.

Although $S_i$ denotes a DFT-spread symbol hereinafter, it may be a modulation symbol before being subjected to DFT-spreading or may imply a spread sequence.

When using QPSK modulation, a CM value of a $1^{st}$ antenna 901 is about 1.22 dB, and a CM value of a $2^{nd}$ antenna 902 is about 1.90 dB. Since the CM value of the $2^{nd}$ antenna 902 is greater, a UE coverage is limited by the CM value of the $2^{nd}$ antenna 902. In addition, when considering antenna power imbalance caused by a hand grip of the UE, the coverage may further decrease.

Therefore, there is a need for a method capable of solving a problem of power imbalance between antennas when applying the SFBC.

Now, switching of spatial processing will be described. To solve the problem of the power imbalance between antennas, switching of spatial processing on a symbol/slot/subframe basis will be proposed.

Figure 23:
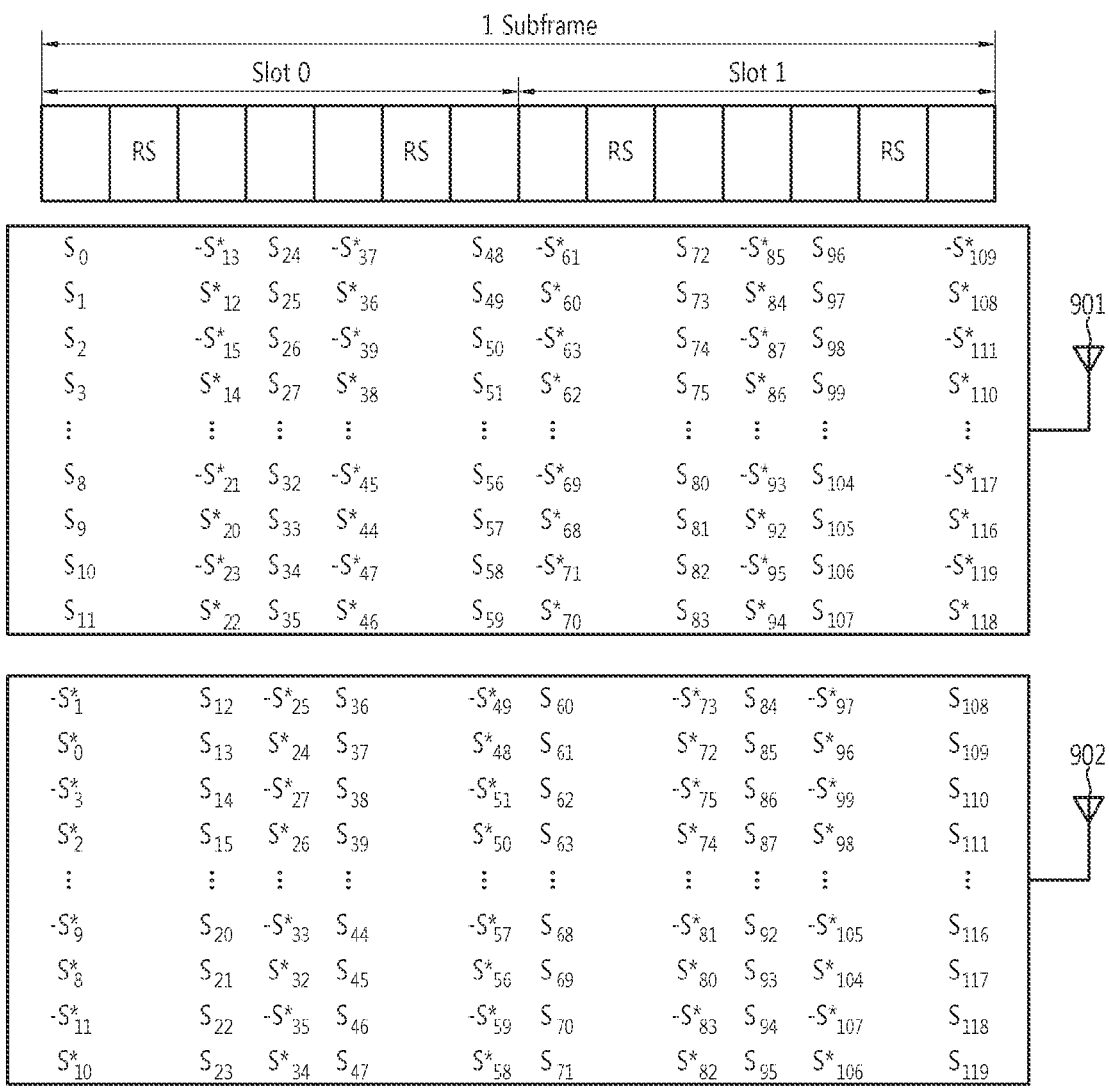
FIG. 23 shows an example of the proposed switched SFBC.

FIG. 23 shows an example of the proposed switched SFBC. The switched SFBC implies switching of SFBC on a symbol basis.

In the example of FIG. 23, transmission symbols in a $1^{st}$ OFDM symbol are subjected to SFBC using the SFBC matrix of Equation 5 above and then are transmitted through a plurality of antennas. Transmission symbols in a $2^{nd}$ OFDM symbol are subjected to SFBC using an SFBC matrix obtained by switching at least one column or at least one row of the SFBC matrix of Equation 5 and then are transmitted through a plurality of antennas.

For example, SFBC can be performed by using an SFBC matrix of Equation 6 below, which is obtained by switching a $1^{st}$ column and a $2^{nd}$ column of the SFBC matrix of Equation 5 above.

$$\begin{bmatrix} -S_{i+1}^* & S_i \\ S_i^* & S_{i+1} \end{bmatrix}$$ [Equation 6]

In a $3^{rd}$ OFDM symbol, SFBC is performed by using the SFBC matrix of Equation 5 above. Therefore, different SFBC is performed on a symbol basis.

Spatial processing is performed in an OFDM symbol and its subsequent OFDM symbol by using a different spatial processing matrix (e.g., SFBC). Therefore, transmit power of antennas can be averaged. In the example of FIG. 23, a CM value of each antenna is about 1.5 dB. Therefore, imbalanced transmit power is averaged.

Regarding a reference signal, switched spatial processing may not be applied for channel estimation per antenna.

SFBC can use at least any one of SFBC matrices shown in Table 11 below in addition to the SFBC matrix of Equation 5 above.

TABLE 11

| (1) $\begin{pmatrix} S_i & S_{i+1} \\ -S_{i+1}^* & S_i^* \end{pmatrix}$ | (2) $\begin{pmatrix} S_i & -S_{i+1} \\ S_{i+1}^* & S_i^* \end{pmatrix}$ |
|---|---|
| (3) $\begin{pmatrix} S_i^* & S_{i+1} \\ -S_{i+1}^* & S_i \end{pmatrix}$ | (4) $\begin{pmatrix} S_i^* & -S_{i+1} \\ S_{i+1}^* & S_i \end{pmatrix}$ |
| (5) $\begin{pmatrix} S_i & S_{i+1}^* \\ -S_{i+1} & S_i^* \end{pmatrix}$ | (6) $\begin{pmatrix} S_i & -S_{i+1}^* \\ S_{i+1} & S_i^* \end{pmatrix}$ |
| (7) $\begin{pmatrix} S_i^* & S_{i+1}^* \\ -S_{i+1} & S_i \end{pmatrix}$ | (8) $\begin{pmatrix} S_i^* & -S_{i+1}^* \\ S_{i+1} & S_i \end{pmatrix}$ |
| (9) $\begin{pmatrix} S_i & S_{i+1} \\ S_{i+1}^* & -S_i^* \end{pmatrix}$ | (10) $\begin{pmatrix} -S_i & S_{i+1} \\ S_{i+1}^* & S_i^* \end{pmatrix}$ |
| (11) $\begin{pmatrix} S_i & S_{i+1}^* \\ S_{i+1} & -S_i^* \end{pmatrix}$ | (12) $\begin{pmatrix} -S_i & S_{i+1}^* \\ S_{i+1} & S_i^* \end{pmatrix}$ |
| (13) $\begin{pmatrix} S_i^* & S_{i+1} \\ S_{i+1}^* & -S_i \end{pmatrix}$ | (14) $\begin{pmatrix} -S_i^* & S_{i+1} \\ S_{i+1}^* & S_i \end{pmatrix}$ |
| (15) $\begin{pmatrix} S_i^* & S_{i+1}^* \\ S_{i+1} & -S_i \end{pmatrix}$ | (16) $\begin{pmatrix} -S_i^* & S_{i+1}^* \\ S_{i+1} & S_i \end{pmatrix}$ |

Although switching of the SFBC in a PUCCH is shown in the example of FIG. 23, the proposed invention can also apply to a PUSCH which is a data channel. To apply the invention to the PUSCH, encoded bits are modulated to generate a plurality of modulation symbols, and the plurality of modulation symbols are subjected to discrete Fourier transform (DFT) spreading. SFBC switching can be performed before or after the DFT spreading. In particular, switching performed before the DFT spreading can be referred to as STBC switching.

Switching of spatial processing can be achieved on a slot basis, a subframe basis, and/or a radio frame basis in addition to a symbol basis.

The present invention can easily apply to a case of using 4 or more antennas. For example, antennas can be divided into a group so that switching is performed on a group basis.

Figure 24:
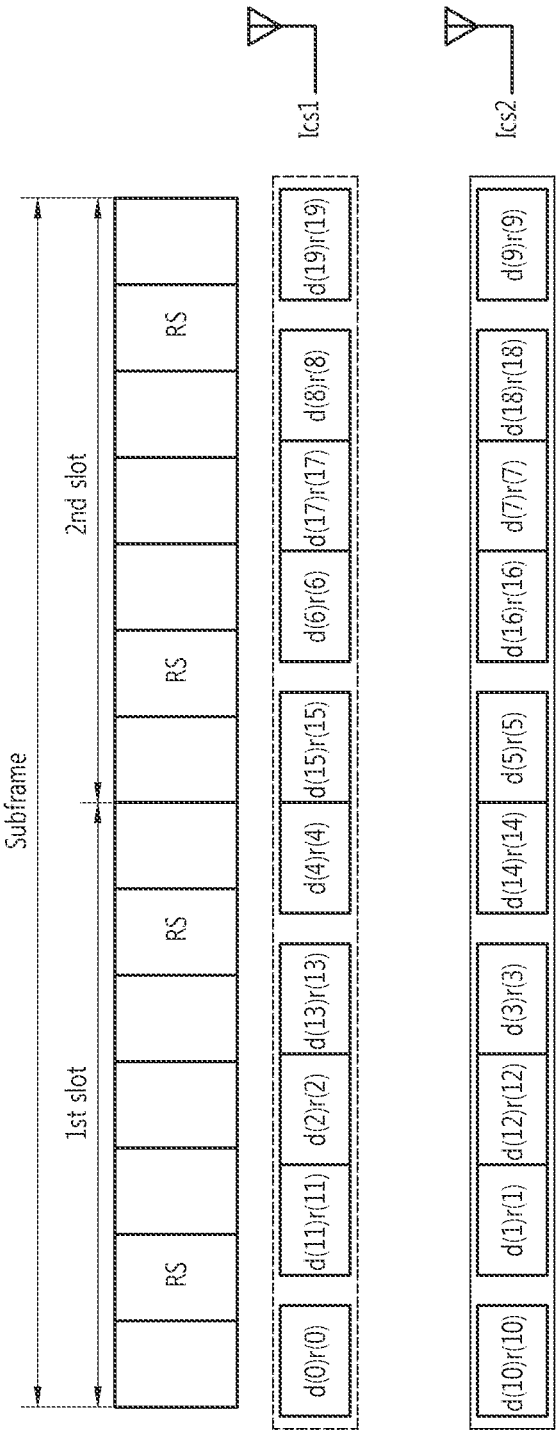
FIG. 24 is an example of applying switching of the proposed spatial processing to the OSRSM of FIG. 9.

FIG. 24 is an example of applying switching of the proposed spatial processing to the OSRSM of FIG. 9. In FIG. 9, $d(0), d(1), \ldots, d(9)$ denote modulation symbols transmitted through a $1^{st}$ antenna, and $d(10), d(11), \ldots, d(19)$ denote modulation symbols transmitted through a $2^{nd}$ antenna. The modulation symbols corresponding to the $1^{st}$ and $2^{nd}$ antennas are mutually exchanged on an OFDM symbol basis.

Although it is shown that cyclically shifted sequences for modulation symbols to be switched are exchanged together, it is also possible to switch only the modulation symbols.

Alternatively, without switching the modulation symbols, it is possible to switch only the cyclically shifted sequences.

Figure 25:
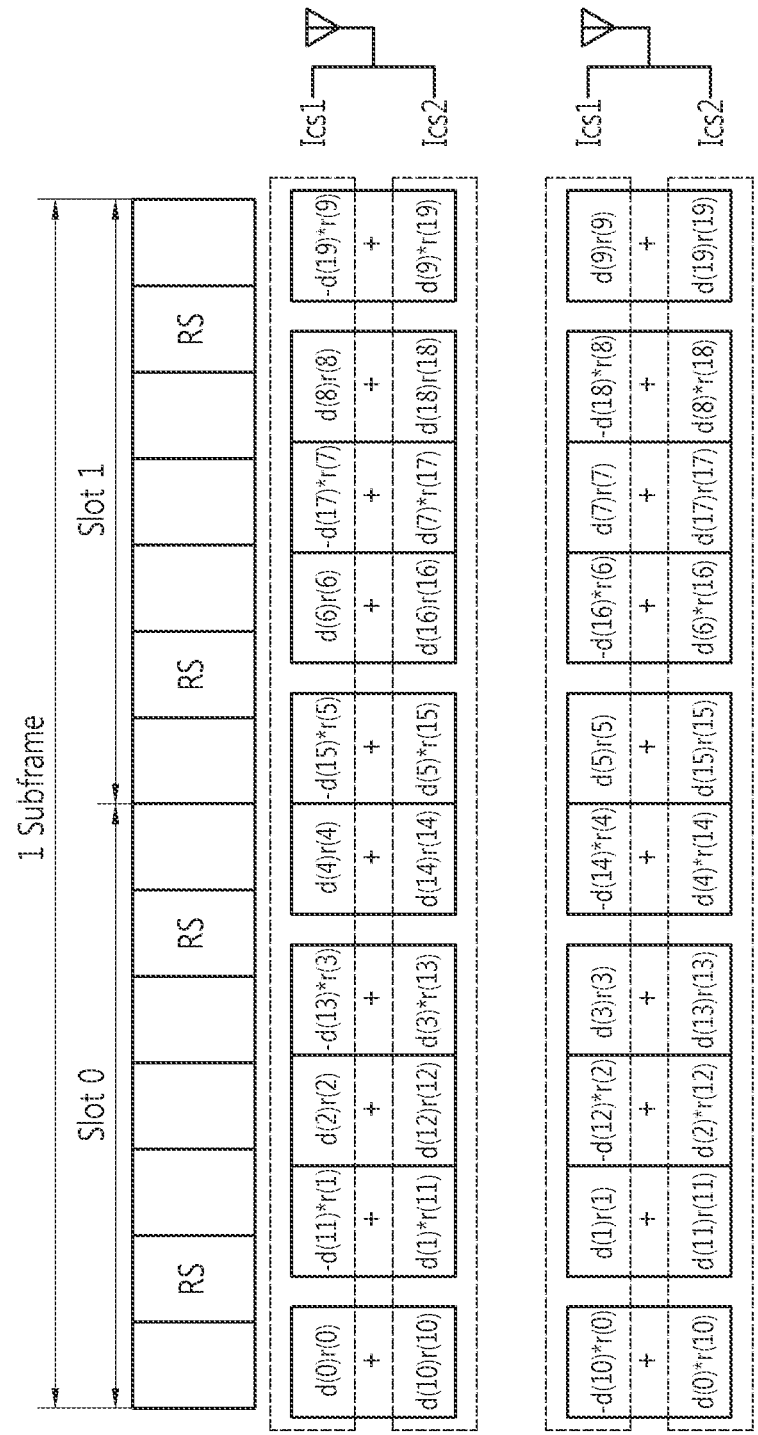
FIG. 25 shows an example of applying the proposed switching to SCBC of FIG. 15.

FIG. 25 shows an example of applying the proposed switching to SCBC of FIG. 15. In this case, SCBC is switched on a symbol basis.

In a 1$^{st}$ OFDM symbol, transmission symbols are subjected to SCBC by using the SCBC matrix (6) of Table 9 and then are transmitted through a plurality of antennas.

In a 2$^{nd}$ OFDM symbol, modulation symbols are subjected to switching such that at least one column of the SCBC matrix is switched, followed by SCBC using an SCBC matrix of Equation 7 below, and then are transmitted through a plurality of antennas.

$$\begin{bmatrix} -S_2^* & S_1 \\ S_1^* & S_2 \end{bmatrix}$$ [Equation 7]

Since different SCBC is performed in an OFDM symbols and its subsequent OFDM symbol, power imbalance between antennas can be averaged.

The SCBC matrix is for exemplary purposes only, and at least one of the SCBC matrices shown in Table 9 can be used.

Figure 26:
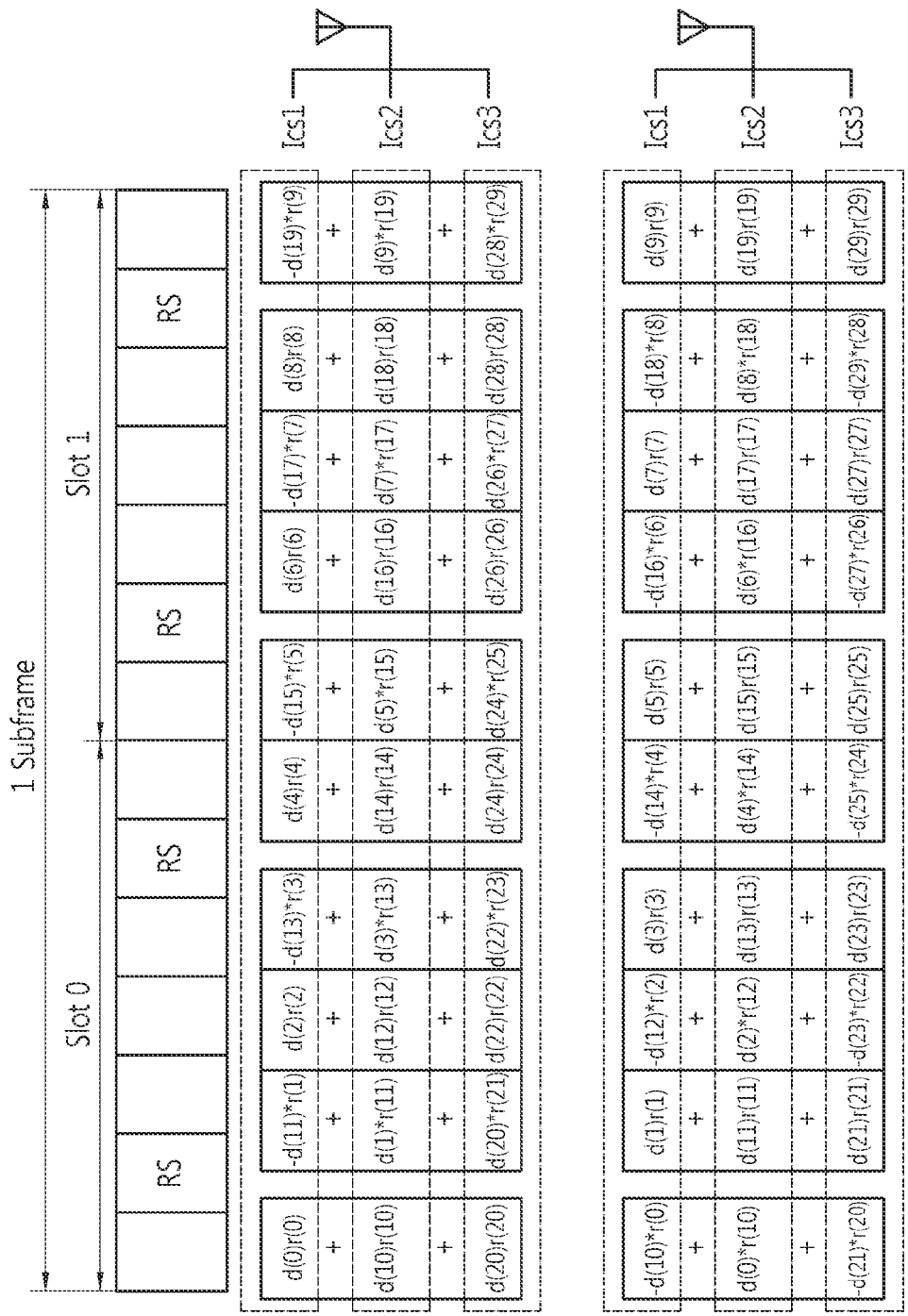
FIG. 26 shows an example of applying the proposed switching to the embodiment of FIG. 18.

FIG. 26 shows an example of applying the proposed switching to the embodiment of FIG. 18. As described above, the embodiment of FIG. 19 is a case where three resources are allocated and SCBC and STBC are used together. In an OFDM symbol and its subsequent OFDM symbol, at least one row (or column) of the SCBC matrix is switched.

Although STBC switching is not performed, not only the SCBC switching but also STBC switching can be performed.

Figure 27:
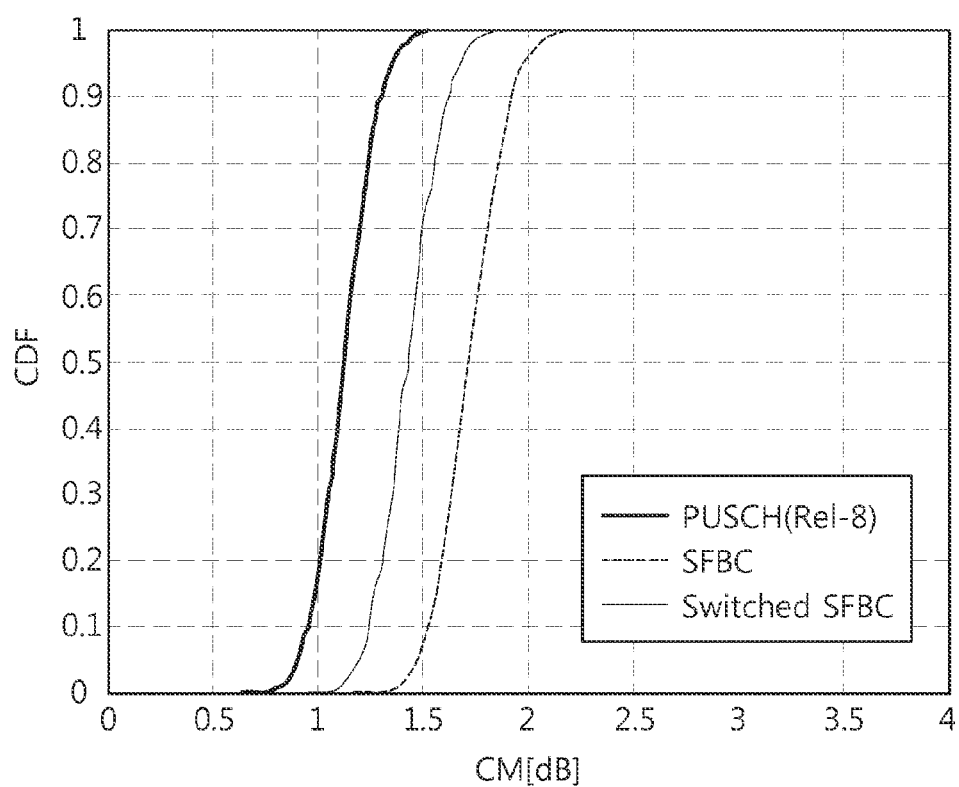
FIG. 27 and FIG. 28 are graphs showing advantages of the present invention.
Figure 28:
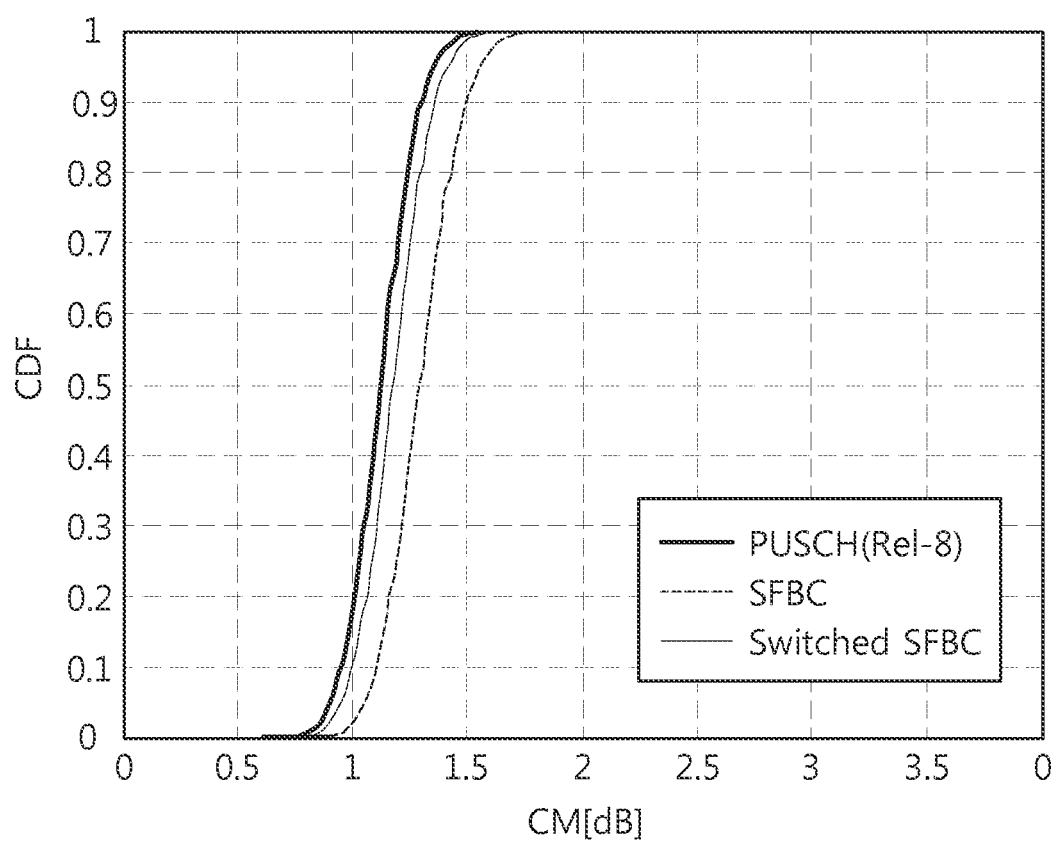

FIG. 27 and FIG. 28 are graphs showing advantages of the present invention.

FIG. 27 shows CM values of a PUSCH structure of the conventional 3GPP LTE, the conventional SFBC, and the proposed invention (indicated by 'SwitchedSFBC'). The CM value of the PUSCH of the 3GPP LTE is about 1.57 dB at 99.9%, the CM value of the SFBC is about 2.23 dB, and the CM value of the present invention is about 1.91 dB. In comparison with the conventional SFBC, it is shown that an average CM per antenna is improved.

FIG. 28 shows CM values of a PUSCH structure of the conventional 3GPP LTE, the conventional STBC, and the proposed invention (indicated by 'SwitchedSFBC'). The structure of FIG. 25 is used in the proposed invention using three resources. The CM value of the PUSCH of the 3GPP LTE is about 1.57 dB, the CM value of the STBC is about 1.78B, and the CM value of the present invention is about 1.64 dB. In comparison with the conventional STBC, it is shown that CM is improved.

Figure 29:
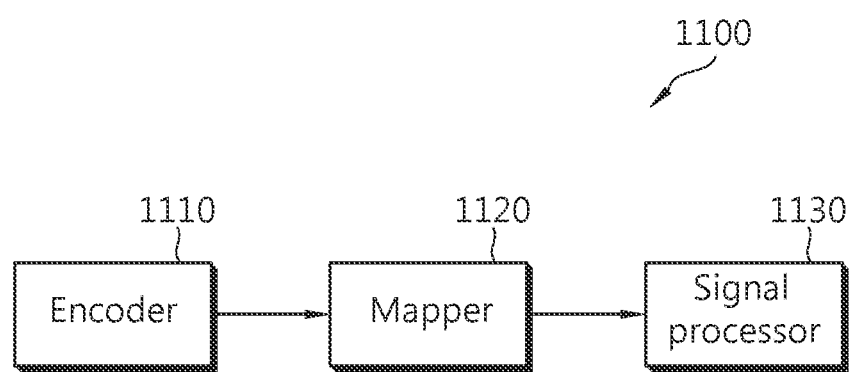
FIG. 29 is a block diagram showing a transmitter according to an embodiment of the present invention.

FIG. 29 is a block diagram showing a transmitter according to an embodiment of the present invention. In uplink, the transmitter may be a part of a UE. In downlink, the transmitter may be a part of a BS.

A transmitter 1100 includes an encoder 1110, a mapper 1120, and a signal processor 1130.

The encoder 1110 generates an encoded bit by encoding an information bit.

The mapper 1120 generates a modulation symbol by mapping the encoded bit on a constellation on the basis of the proposed resource selection scheme. The mapper 1120 can perform modulation on a typical constellation, and also can perform modulation by using a mapping rule to which MSM and/or resource element is applied.

The signal processor 1130 transmits a radio signal by processing a modulation symbol. The signal processor 1130 can implement the aforementioned STBC, SFBC, SCBC, and OSRSM. The signal processor 1130 can perform switching of spatial processing by using at least one of the STBC, SFBC, SCBC, and OSRSM as shown in the embodiments of FIG. 23 to FIG. 26.

Figure 30:
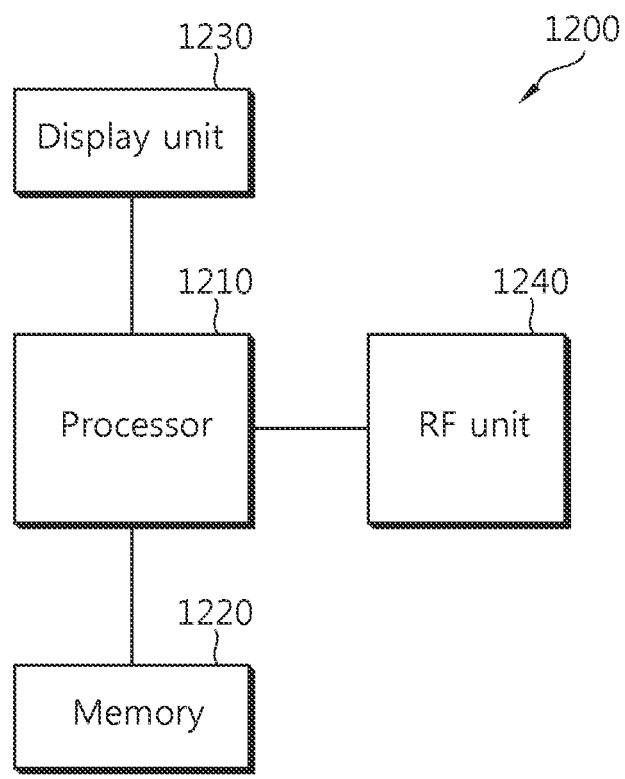
FIG. 30 is a block diagram of a UE according to an embodiment of the present invention.

FIG. 30 is a block diagram of a UE according to an embodiment of the present invention.

A UE 1200 includes a processor 1210, a memory 1220, a display unit 1230, and a radio frequency (RF) unit 1240. The RF unit 1240 coupled to the processor 1210 transmits and/or receives a radio signal. The memory 1220 coupled to the processor 1210 stores information required for an operation of the processor 1210. The display unit 1230 displays a variety of information of the UE 1200, and can use well-known elements such as liquid crystal display (LCD), organic light emitting diode (OLED), etc.

The processor 1210 can implement a physical layer based on the 3GPP LTE/LTE-A standard, and implements the proposed methods. The processor 1210 can implement the encoder 1110, the mapper 1120, and the signal processor 1130.

The processor 1210 may include an application-specific integrated circuit (ASIC), a separate chipset, a logic circuit, and/or a data processing unit. The memory 1220 may include a read-only memory (ROM), a random access memory (RAM), a flash memory, a memory card, a storage medium, and/or other equivalent storage devices. The RF unit 1240 may include a base-band circuit for processing a radio signal. When the embodiment of the present invention is implemented in software, the aforementioned methods can be implemented with a module (i.e., process, function, etc.) for performing the aforementioned functions. The module may be stored in the memory 1220 and may be performed by the processor 1210. The memory 1220 may be located inside or outside the processor 1210, and may be coupled to the processor 1210 by using various well-known means.

Now, a transmission method that can be implemented according to an embodiment of the present invention will be described.

A subblock is a resource unit for mapping time-domain symbols and/or frequency-domain symbols to radio resources. For example, the subblock may include 12 subcarriers. Respective subblocks may be contiguous to each other or may not contiguous to each other. An amount (or size) of resource included in each subblock may be equal or different. For example, a subblock #1 may include 12 subcarriers, and a subblock #2 may include 24 subcarriers. The subblock may also be referred to as other terms such as a cluster, a resource block, a subchannel, etc. Alternatively, one or more subblocks may correspond to one component carrier. The component carrier is defined with a center frequency and a bandwidth.

Figure 31:
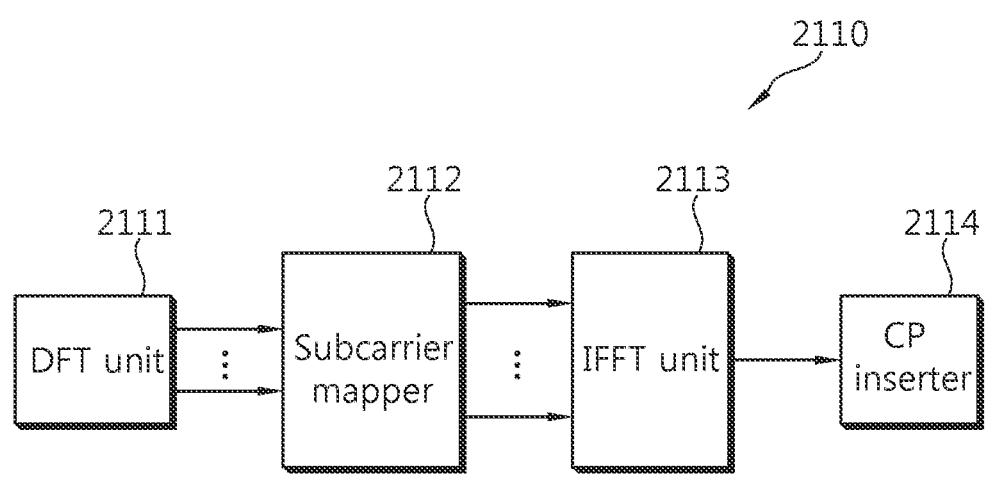
FIG. 31 is a block diagram showing a signal processing device for performing SC-FDMA.

FIG. 31 is a block diagram showing a signal processing device for performing SC-FDMA. The SC-FDMA is a transmission scheme in which IFFT is performed after DFT spreading. The SC-FDMA is also called DFT-spread OFDM (DFT-s OFDM).

A signal processing device 2110 includes a discrete Fourier transform (DFT) unit 2111, a subcarrier mapper 2112, an inverse fast Fourier transform (IFFT) unit 2113, and a CP inserter 2114. The DFT unit 2111 outputs DFT symbols by performing DFT on complex-valued symbols. The subcarrier mapper 2112 maps the DFT symbols to respective subcarriers in a frequency domain. The IFFT unit 2113 outputs time-domain signals by performing IFFT on the symbols mapped in the frequency domain. The CP inserter 2114 inserts a CP to the time-domain signals. The time-domain signal to which the CP is inserted is an OFDM symbol. If the sequence in use is a frequency-domain sequence which has already been DFT-spread, IFFT can be performed directly without having to additionally perform DFT.

Figure 32:
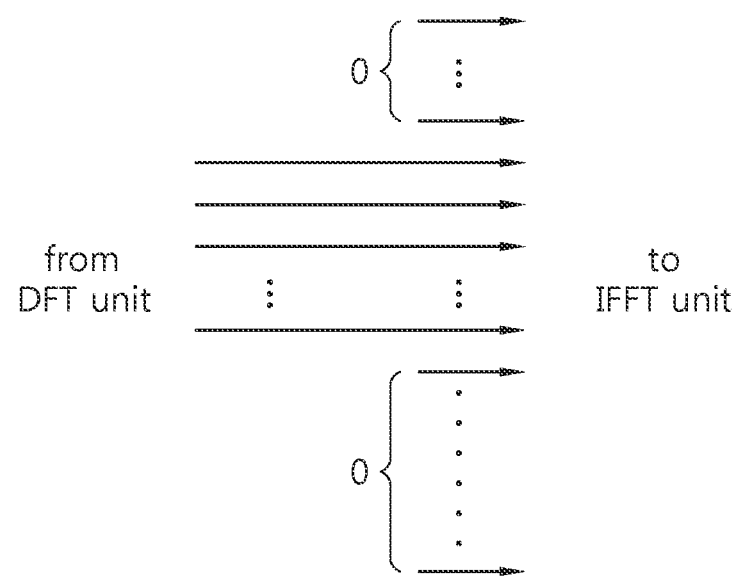
FIG. 32 shows an example of subcarrier mapping.

FIG. 32 shows an example of subcarrier mapping. DFT symbols output from a DFT unit are mapped to contiguous subcarriers in a frequency domain. This is called localized mapping.

Figure 33:
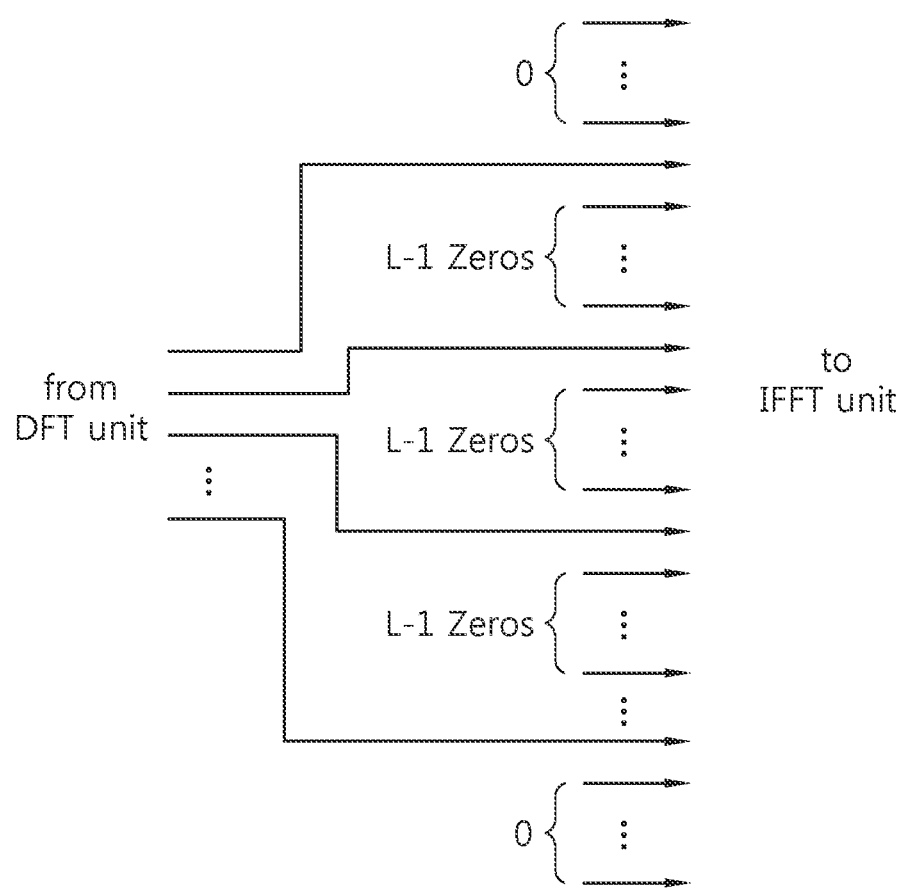
FIG. 33 shows another example of subcarrier mapping.

FIG. 33 shows another example of subcarrier mapping. DFT symbols output from a DFT unit are mapped to non-contiguous subcarriers. The DFT symbols may be mapped to subcarriers equidistantly distributed in a frequency domain. This is called distributed mapping.

Figure 34:
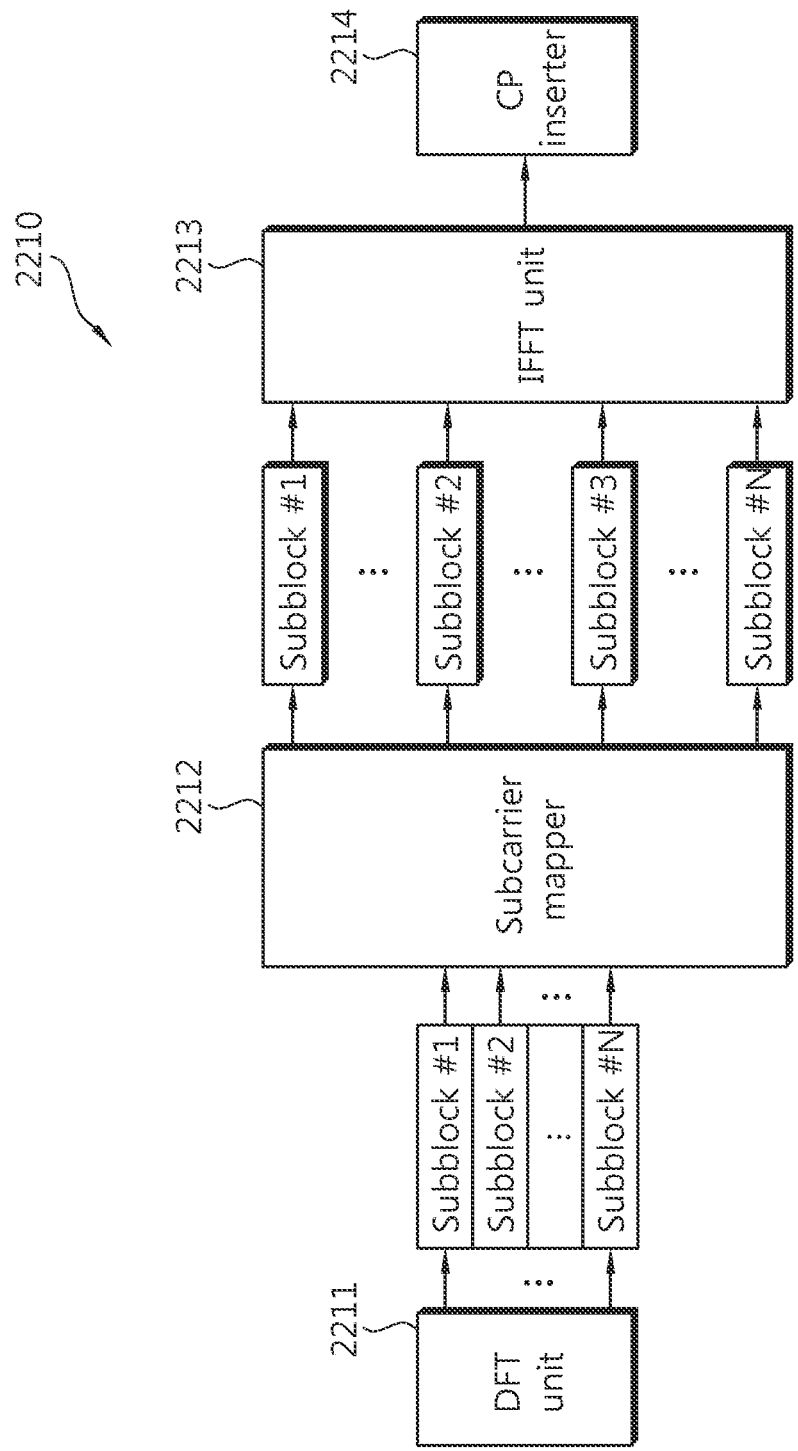
FIG. 34 is a block diagram showing a signal processing device for performing clustered SC-FDMA.

FIG. 34 is a block diagram showing a signal processing device for performing clustered SC-FDMA. A method of processing symbols subjected to DFT by dividing them on a subblock basis is called clustered SC-FDMA or clustered DFT-s OFDM.

A signal processing device 2210 includes a DFT unit 2211, a subcarrier mapper 2212, an IFFT unit 2213, and a CP inserter 2214.

DFT symbols output from the DFT unit 2211 are divided into N subblocks (where N is a natural number). Herein, the N subblocks can be expressed by a subblock #1, a subblock #2, . . . , a subblock #N. The subcarrier mapper 2212 maps the N subblocks to frequency-domain subcarriers on a subblock basis. The subcarrier mapper 2212 can perform localized mapping or distributed mapping on a subblock basis. The IFFT unit 2213 outputs time-domain signals by performing IFFT on the subblocks mapped in the frequency domain. The CP inserter 2214 inserts a CP to the time-domain signals.

The signal processing device 2210 can support single-carrier transmission or multi-carrier transmission. When supporting only the single-carrier transmission, all of the N subblocks correspond to one carrier. When supporting the multi-carrier transmission, at least one subblock among the N subblocks can correspond to each carrier.

Figure 35:
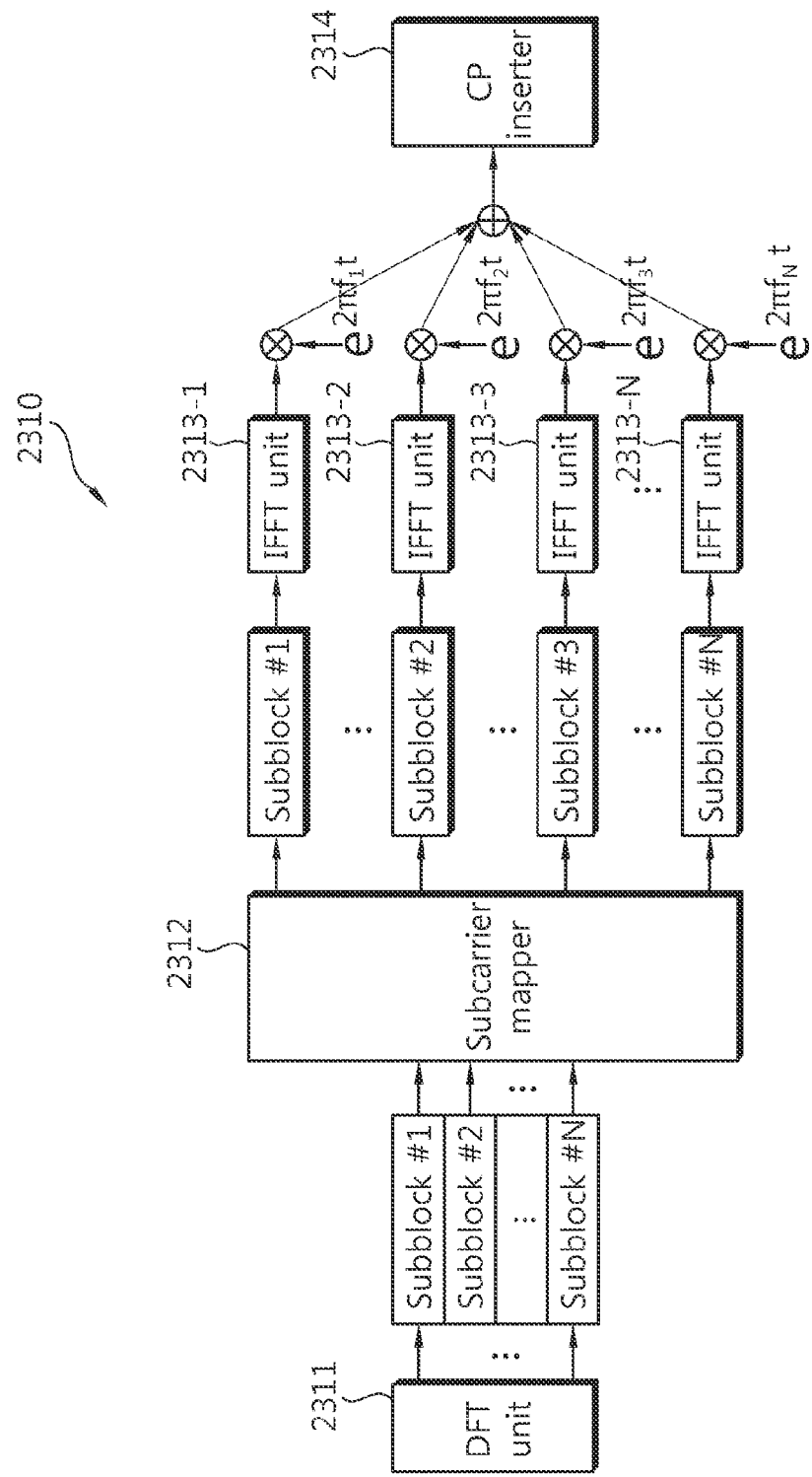
FIG. 35 is a block diagram showing another example of a signal processing device.

FIG. 35 is a block diagram showing another example of a signal processing device.

A signal processing device 2310 includes a DFT unit 2311, a subcarrier mapper 2312, a plurality of IFFT units 2313-1, 2313-2, . . . , 2313-N, and a CP inserter 2314 (where N is a natural number).

DFT symbols output from the DFT unit 2311 are divided into N subblocks. The subcarrier mapper 2312 maps the N subblocks to subcarriers in a frequency domain on a subblock basis. The subcarrier mapper 2312 performs localized mapping or distributed mapping on a subblock basis. IFFT is performed independently on each subblock mapped in the frequency domain. The CP inserter 2314 inserts a CP to a time-domain signal. The $n^{th}$ IFFT unit 2313-$n$ outputs an $n^{th}$ time-domain signal by performing IFFT on a subblock #n (where n=1, 2, . . . , N). The $n^{th}$ time-domain signal is multiplied by an $n^{th}$ carrier ($f_n$) signal to generate an $n^{th}$ radio signal. N radio signals generated from the N subblocks are added up, and then a CP is inserted thereto by the CP inserter 2314.

The subblocks can respectively correspond to the component carriers. The respective subblocks can correspond to contiguous component carriers or can correspond to non-contiguous component carriers.

Figure 36:
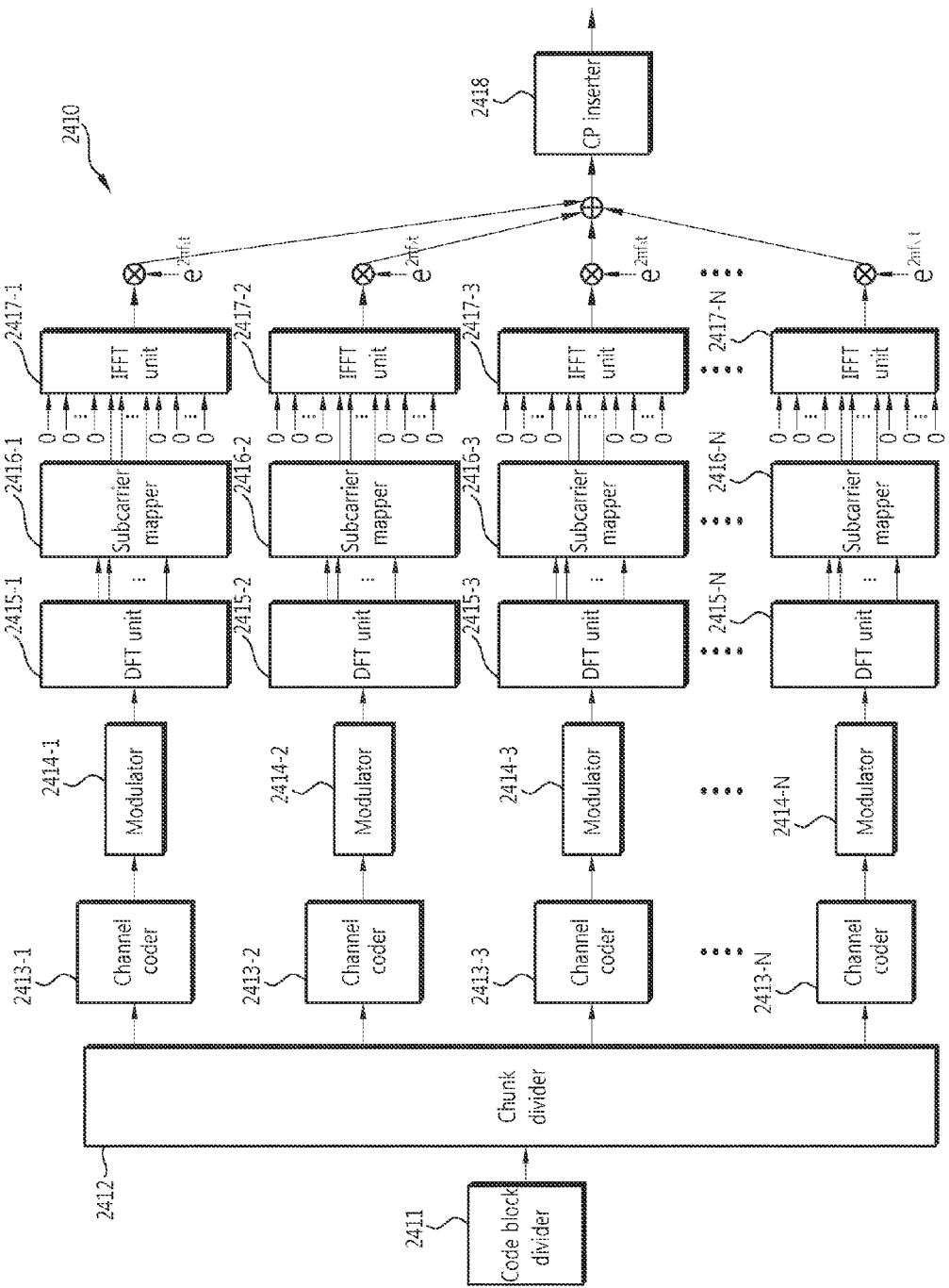
FIG. 36 is a block diagram showing another example of a signal processing device.

FIG. 36 is a block diagram showing another example of a signal processing device.

A signal processing device 2410 includes a code block divider 2411, a chunk divider 2412, a plurality of channel coders 2413-1, . . . , 2413-N, a plurality of modulators 2414-1, . . . , 2414-N, a plurality of DFT units 2415-1, . . . , 2415-N, a plurality of subcarrier mappers 2416-1, . . . , 2416-N, a plurality of IFFT units 2417-1, . . . , 2417-N, and a CP inserter 2418 (where N is a natural number). Herein, N may be the number of multiple carriers used by the multi-carrier transmitter.

The code block divider 2411 divides a transport block into a plurality of code blocks. The chunk divider 2412 divides the code block into a plurality of chunks. Herein, the code block can be regarded as data transmitted from the multi-carrier signal processing device, and the chunk can be regarded as a data segment transmitted through one carrier among multiple carriers. DFT is performed on a chunk basis. When the DFT is performed on a chunk basis in a transmission method, this is called chunk specific DFT-s OFDM or Nx SC-FDMA. This can be used for contiguous carrier allocation or non-contiguous carrier allocation. The divided chunks are sequentially subjected to the plurality of channel coders 2413-1, . . . , 2413-N and the plurality of modulators 2414-1, . . . , 2414-N to generate complex-valued symbols. The complex-valued symbols, which are respectively subjected to the plurality of DFT units 2415-1, . . . , 2415-N, the plurality of subcarrier mappers 2416-1, . . . , 2416-N, and the plurality of IFFT units 2417-1, . . . , 2417-N, are added up, and then a CP is added thereto by the CP inserter 2418.

An OFDM symbol may be a time-domain symbol to which any multiple access scheme is applied such as OFDMA, DFT-s OFDM, clustered DFT-s OFDM, and/or chunk-specific DFT-s OFDM. However, the OFDM symbol is not limited to a specific multiple-access scheme.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

What is claimed is:

1. A method for uplink transmission in a multi-antenna system, the method comprising:
    generating a plurality of first uplink transmission symbols and a plurality of second uplink transmission symbols by performing discrete Fourier transform (DFT) spreading on a plurality of modulation symbols generated by modulating encoded bits;
    transmitting the plurality of first uplink transmission symbols on a physical uplink shared channel (PUSCH) through a plurality of antennas by using a first spatial process performed on the plurality of first uplink transmission symbols in odd-numbered orthogonal frequency division multiplexing (OFDM) data symbols; and
    transmitting the plurality of second uplink transmission symbols on a physical uplink shared channel (PUSCH) through the plurality of antennas by using a second spatial process performed on the plurality of uplink second transmission symbols in even-numbered OFDM data symbols,
    wherein at least one row or at least one column of a first spatial processing matrix used in the first spatial process is switched to configure a second spatial processing matrix used in the second spatial process, and
    wherein the first spatial processing matrix is different from the second spatial processing matrix.

2. The method of claim 1, wherein:
the first and second spatial processes are space-frequency block coding (SFBC); and
the first and second spatial processing matrices are SFBC matrices.

3. The method of claim 1, wherein:
the first and second spatial processes are space-code block coding (SCBC); and
the first and second spatial processing matrices are SCBC matrices.

4. The method of claim 1,
wherein the plurality of first uplink transmission symbols and the plurality of second uplink transmission symbols are modulation symbols generated by modulating encoded bits.

5. The method of claim 4, wherein the plurality of first uplink transmission symbols and the plurality of second uplink transmission symbols are transmitted on a physical uplink control channel (PUCCH).

6. The method of claim 1, wherein the plurality of first uplink transmission symbols and the plurality of second uplink transmission symbols are independently generated.

7. A user equipment (UE) comprising:
a radio frequency (RF) unit configured to transmit and receive a radio signal; and
a processor, coupled to the RF unit, and configured to:
generate a plurality of first uplink transmission symbols and a plurality of second uplink transmission symbols by performing discrete Fourier transform (DFT) spreading on a plurality of modulation symbols generated by modulating encoded bits;
transmit the plurality of first uplink transmission symbols on a physical uplink shared channel (PUSCH) through a plurality of antennas by using a first spatial process performed on the plurality of first uplink transmission symbols in odd-numbered data orthogonal frequency division multiplexing (OFDM) data symbols; and
transmit the plurality of second uplink transmission symbols on a physical uplink shared channel (PUSCH) through the plurality of antennas by using a second spatial process performed on the plurality of second uplink transmission symbols in even-numbered OFDM data symbols,
wherein at least one row or at least one column of a first spatial processing matrix used in the first spatial process is switched to configure a second spatial processing matrix used in the second spatial process, and
wherein the first spatial processing matrix is different from the second spatial processing matrix.

8. The UE of claim 7, wherein:
the first and second spatial processes are space-frequency block coding (SFBC); and
the first and second spatial processing matrices are SFBC matrices.

9. The UE of claim 7, wherein:
the first and second spatial processes are space-code block coding (SCBC); and
the first and second spatial processing matrices are SCBC matrices.

10. The UE of claim 7,
wherein the plurality of first uplink transmission symbols and the plurality of second uplink transmission symbols are modulation symbols generated by modulating encoded bits.

11. The UE of claim 10, wherein the plurality of first uplink transmission symbols and the plurality of second uplink transmission symbols are transmitted on a physical uplink control channel (PUCCH).

12. The UE of claim 7, wherein the plurality of first uplink transmission symbols and the plurality of second uplink transmission symbols are independently generated.

* * * * *